(12) United States Patent
Sugita et al.

(10) Patent No.: US 8,999,592 B2
(45) Date of Patent: Apr. 7, 2015

(54) FUEL CELL

(75) Inventors: Narutoshi Sugita, Utsunomiya (JP);
Shuhei Goto, Utsunomiya (JP); Kentaro Ishida, Utsunomiya (JP); Tetsuya Nakamura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 381 days.

(21) Appl. No.: 13/432,105

(22) Filed: Mar. 28, 2012

(65) Prior Publication Data

US 2012/0258377 A1 Oct. 11, 2012

(30) Foreign Application Priority Data

Apr. 7, 2011 (JP) ................................. 2011-085536

(51) Int. Cl.
*H01M 8/04* (2006.01)
*H01M 8/02* (2006.01)
*H01M 8/10* (2006.01)
*H01M 8/24* (2006.01)

(52) U.S. Cl.
CPC .......... *H01M 8/0273* (2013.01); *H01M 8/0206* (2013.01); *H01M 8/0267* (2013.01); *H01M 8/04089* (2013.01); *H01M 8/1004* (2013.01); *H01M 8/242* (2013.01); *H01M 2008/1095* (2013.01); *Y02E 60/521* (2013.01)

(58) Field of Classification Search
CPC ............ H01M 8/0258; H01M 8/0267; H01M 8/0273; H01M 8/0284
USPC ......................................................... 429/434
See application file for complete search history.

(56) References Cited

U.S. PATENT DOCUMENTS

| | | | |
|---|---|---|---|
| 2004/0131905 A1* | 7/2004 | Enjoji et al. | 429/26 |
| 2004/0219410 A1* | 11/2004 | Tanaka et al. | 429/26 |
| 2009/0004539 A1 | 1/2009 | Ishikawa et al. | |
| 2009/0042086 A1* | 2/2009 | Ishikawa et al. | 429/35 |

FOREIGN PATENT DOCUMENTS

| | | |
|---|---|---|
| EP | 1 526 594 A2 | 4/2005 |
| JP | 2011-018525 A | 1/2011 |
| JP | 2011-018526 A | 1/2011 |

* cited by examiner

*Primary Examiner* — Jonathan Jelsma

(74) *Attorney, Agent, or Firm* — Carrier Blackman & Associates, P.C.; Joseph P. Carrier; William D. Blackman

(57) ABSTRACT

A cell unit of a fuel cell includes a first membrane electrode assembly, a first metal separator, a second membrane electrode assembly, and a second metal separator. Frames are provided at outer circumferences of the first and second membrane electrode assemblies. An oxygen-containing gas supply passage and a fuel gas supply passage, and an oxygen-containing gas discharge passage and a fuel gas discharge passage are provided in one pair of opposite sides of the frames, and a pair of coolant supply passages and a pair of coolant discharge passages are provided in the other pair of opposite sides of the frames at distances from one another.

7 Claims, 27 Drawing Sheets

FUEL CELL

CROSS-REFERENCE TO RELATED APPLICATION

This application is based upon and claims the benefit of priority from Japanese Patent Application No. 2011-085536 filed on Apr. 7, 2011, of which the contents are incorporated herein by reference.

BACKGROUND OF THE INVENTION

1. Field of the Invention

The present invention relates to a fuel cell including cell units each formed by stacking an electrolyte electrode assembly and a metal separator. The electrolyte electrode assembly includes a pair of electrodes and an electrolyte interposed between the electrodes. A coolant flow field for allowing a coolant to flow along a separator surface is formed between the adjacent cell units.

2. Description of the Related Art

For example, a solid polymer electrolyte fuel cell employs a membrane electrode assembly (electrolyte electrode assembly) (MEA) which includes an anode, a cathode, and a solid polymer electrolyte membrane interposed between the anode and the cathode. The solid polymer electrolyte membrane is a polymer ion exchange membrane. Each of the anode and the cathode includes an electrode catalyst layer and a porous carbon layer. The membrane electrode assembly and separators (bipolar plates) sandwiching the membrane electrode assembly make up a unit cell. In use, generally, a predetermined number of unit cells are stacked together to form a fuel cell stack mounted in a vehicle.

In general, the fuel cell adopts so called internal manifold structure where supply passages and discharge passages extend through separators in a stacking direction. The fuel gas, the oxygen-containing gas, and the coolant are supplied from the respective supply passages respectively to a fuel gas flow field, an oxygen-containing gas flow field and a coolant flow field along electrode surfaces, and then, the fuel gas, the oxygen-containing gas and the coolant are discharged into the respective discharge passages.

For example, a fuel cell disclosed in Japanese Laid-Open Patent Publication No. 2011-018525 has a stack structure formed by stacking a membrane electrode assembly and a separator. A seal is formed integrally with the membrane electrode assembly. The separator includes an anode plate, a cathode plate and an intermediate plate. As shown in FIG. 27, the anode plate has a laterally elongated rectangular plate.

A fuel gas flow field 1 including a plurality of flow grooves 1$a$ is formed in a surface of the anode plate. At one end of the long side of the anode plate, an oxygen-containing gas discharge passage 2$b$, a coolant supply passage 3$a$ and a fuel gas supply passage 4$a$ are arranged vertically, and at the other end of the long side of the anode plate, a fuel gas discharge passage 4$b$, a coolant discharge passage 3$b$ and an oxygen-containing gas supply passage 2$a$ are arranged vertically.

The fuel gas supply passage 4$a$ and the fuel gas discharge passage 4$b$, and the fuel gas flow field 1 are connected by through holes 5$a$, 5$b$. Though not shown, the cathode plate and the intermediate plate have the same structure as the anode plate.

SUMMARY OF THE INVENTION

In each of the separators, the oxygen-containing gas discharge passage 2$b$, the coolant supply passage 3$a$, the fuel gas supply passage 4$a$, the fuel gas discharge passage 4$b$, the coolant discharge passage 3$b$, and the oxygen-containing gas supply passage 2$a$ are formed at both ends of reactant gas flow field (or coolant flow field) such as the fuel gas flow field 1.

In the structure, the surface area of the separator is considerably large. In particular, when a metal separator is used, the amount of expensive material such as stainless steel for producing the metal separator becomes large, and the unit cost for the component becomes high. Further, in the separator, three through holes are formed in each of both ends in the longitudinal direction, and the through holes are arranged in the width direction indicated by the arrow H. In the structure, the dimension of the separator in the direction indicated by the arrow H is considerably large. Therefore, the width cannot be reduced easily.

The present invention has been made to solve the problem of this type, and an object of the present invention is to provide a fuel cell which is capable of suitably reducing the size of relatively expensive metal separators and effectively reducing the width of the fuel cell.

The present invention relates to a fuel cell including cell units each formed by stacking an electrolyte electrode assembly and a metal separator in a stacking direction. The electrolyte electrode assembly includes a pair of electrodes and an electrolyte interposed between the electrodes. A coolant flow field for allowing a coolant to flow along a separator surface is formed between the adjacent cell units.

A resin frame member is formed integrally with an outer end of the electrolyte electrode assembly. A reactant gas supply passage and a reactant gas discharge passage extend through one pair of opposite sides of the resin frame member in the stacking direction as passages of a reactant gas. A pair of coolant supply passages and a pair of coolant discharge passages extend through the other pair of opposite sides of the resin frame member in the stacking direction for allowing the coolant to flow therethrough. The coolant supply passages are positioned adjacent to the reactant gas supply passage or the reactant gas discharge passage, and the coolant discharge passages are positioned adjacent to the reactant gas discharge passage or the reactant gas supply passage.

Further, the fuel cell includes connection channels connecting the coolant supply passages and the coolant discharge passages with the coolant flow field. Each of the connection channels has a through hole provided in the metal separator, and a through hole provided in the frame member.

In the present invention, fluid passages extend through the resin frame members provided at the outer circumferences of the electrolyte electrode assemblies. In the structure, no fluid passages are required in the metal separators.

The metal separators can be formed into an outer shape having dimensions which correspond to the power generation area. Thus, reduction in the size and weight of the metal separators can be achieved easily, and it becomes possible to reduce the production cost of the metal separators. Accordingly, the metal separators can be manufactured efficiently, and thus it becomes possible to obtain the entire fuel cell economically.

Further, in the electrolyte electrode assembly, only the reactant gas supply passages and the reactant gas discharge passages are provided in one pair of opposite sides of the resin frame member, and only the coolant supply passages and the coolant discharge passages are provided in the other pair of opposite sides of the resin frame member. Thus, in the cell units, the dimension of the one pair of opposite sides, i.e., the width is reduced as much as possible, and it becomes possible to install the fuel cell more easily.

Further, the coolant supply passages and the coolant discharge passages are provided separately on the other pair of opposite sides. Therefore, the coolant can flow through the coolant flow field more uniformly and reliably. It becomes possible to maintain the uniform humidity environment over the entire power generation area, and power generation can be performed efficiently.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
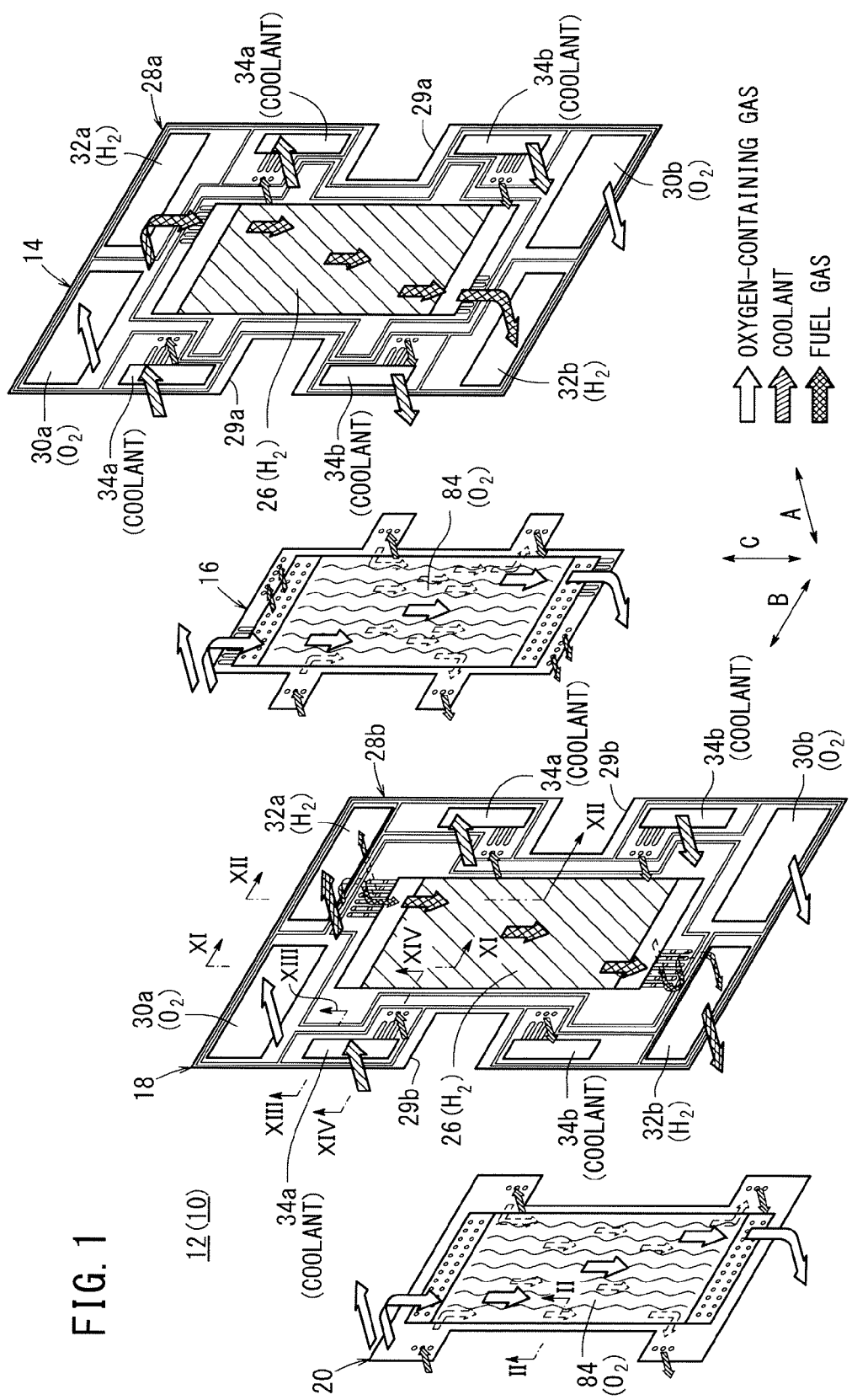
FIG. 1 is an exploded perspective view showing a fuel cell according to a first embodiment of the present invention.
Figure 2:
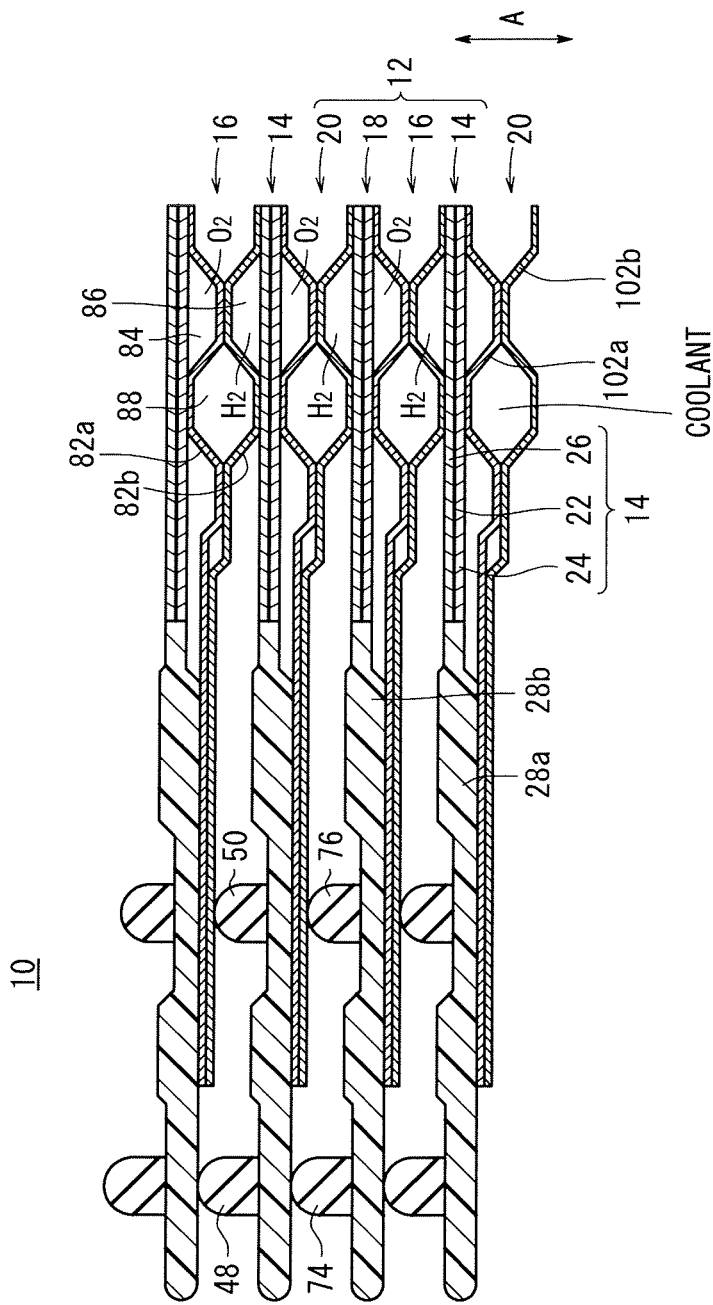
FIG. 2 is a cross sectional view showing the fuel cell, taken along a line II-II in FIG. 1.

As shown in FIGS. 1 and 2, a fuel cell 10 according to a first embodiment of the present invention is formed by stacking a plurality of cell units 12 in a horizontal direction indicated by an arrow A.

The cell unit 12 includes a first membrane electrode assembly (electrolyte electrode assembly) (MEA) 14, a first metal separator 16, a second membrane electrode assembly (electrolyte electrode assembly) (MEA) 18, and a second metal separator 20. By stacking the cell units 12, the first membrane electrode assembly 14 is sandwiched between the second and first metal separators 20, 16, and the second membrane electrode assembly 18 is sandwiched between the first and second metal separators 16, 20.

Each of the first membrane electrode assembly 14 and the second membrane electrode assembly 18 includes a cathode 24, an anode 26, and a solid polymer electrolyte membrane (electrolyte) 22 interposed between the cathode 24 and the anode 26 (see FIG. 2). The solid polymer electrolyte membrane 22 is formed by impregnating a thin membrane of perfluorosulfonic acid with water, for example.

In the solid polymer electrolyte membrane 22, the surface area of the cathode 24 and the surface area of the anode 26 are the same. It should be noted that the outer circumferential portion of the solid polymer electrolyte membrane 22 may protrude beyond the cathode 24 and the anode 26. The surface area of the cathode 24 may be different from the surface area of the anode 26.

In the first membrane electrode assembly 14, a frame (resin frame member) 28a made of insulating polymer material is formed integrally with the outer circumferential edges of the solid polymer electrolyte membrane 22, the cathode 24 and the anode 26, e.g., by injection molding. Likewise, in the second membrane electrode assembly 18, a frame (resin frame member) 28b made of polymer material is formed integrally with the outer circumferential edges of the solid polymer electrolyte membrane 22, the cathode 24 and the anode 26, e.g., by injection molding. For example, engineering plastics and super engineering plastics as well as commodity plastics may be adopted as the polymer material.

As shown in FIG. 1, each of the frames 28a, 28b has a substantially rectangular shape elongated in a direction indicated by an arrow C. A pair of recesses 29a, 29b are formed centrally in each of the frames 28a, 28b by cutting the central portion of each long side inwardly.

Each of the cathode 24 and the anode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer.

As shown in FIG. 1, at one end (upper end) of the frames 28a, 28b in a vertical direction indicated by an arrow C, an oxygen-containing gas supply passage 30a for supplying an oxygen-containing gas (reactant gas) and a fuel gas supply passage 32a for supplying a fuel gas (reactant gas) such as a hydrogen-containing gas are arranged in a horizontal direction in a direction indicated by an arrow B.

At the other end (lower end) of the frames 28a, 28b in the vertical direction indicated by the arrow C, a fuel gas discharge passage 32b for discharging the fuel gas and an oxygen-containing gas discharge passage 30b for discharging the oxygen-containing gas are arranged in the direction indicated by the arrow B.

At upper positions at both ends of the frames 28a, 28b in the direction indicated by the arrow B, a pair of coolant supply passages 34a for supplying a coolant are provided, and at lower positions at both ends of the frames 28a, 28b in the direction indicated by the arrow B, a pair of coolant discharge passages 34b for discharging the coolant are provided. The coolant supply passages 34a and the coolant discharge passages 34b extend through the frames 28a, 28b in the direction indicated by the arrow A.

The coolant supply passages 34a are positioned adjacent to the oxygen-containing gas supply passage 30a and the fuel gas supply passage 32a, separately on the sides (other pair of sides) at both ends in the direction indicated by the arrow B. The coolant discharge passages 34b are positioned adjacent to the oxygen-containing gas discharge passage 30b and the fuel gas discharge passage 32b, separately on the sides at both ends in the direction indicated by the arrow B. The coolant supply passages 34a and the coolant discharge passages 34b may be provided upside down. That is, the coolant supply passages 34a may be positioned adjacent to the oxygen-containing gas discharge passage 30b and the fuel gas discharge passage 32b.

In the first and second membrane electrode assemblies 14, 18, on one pair of opposite sides, i.e., on both of upper and lower short sides, the oxygen-containing gas supply passage 30a and the fuel gas supply passage 32a, and the oxygen-containing gas discharge passage 30b and the fuel gas discharge passage 32b are provided, and on the other pair of opposite sides, i.e., on both of left and right long sides, the pair of coolant supply passages 34a and the pair of coolant discharge passages 34b are provided.

Figure 3:
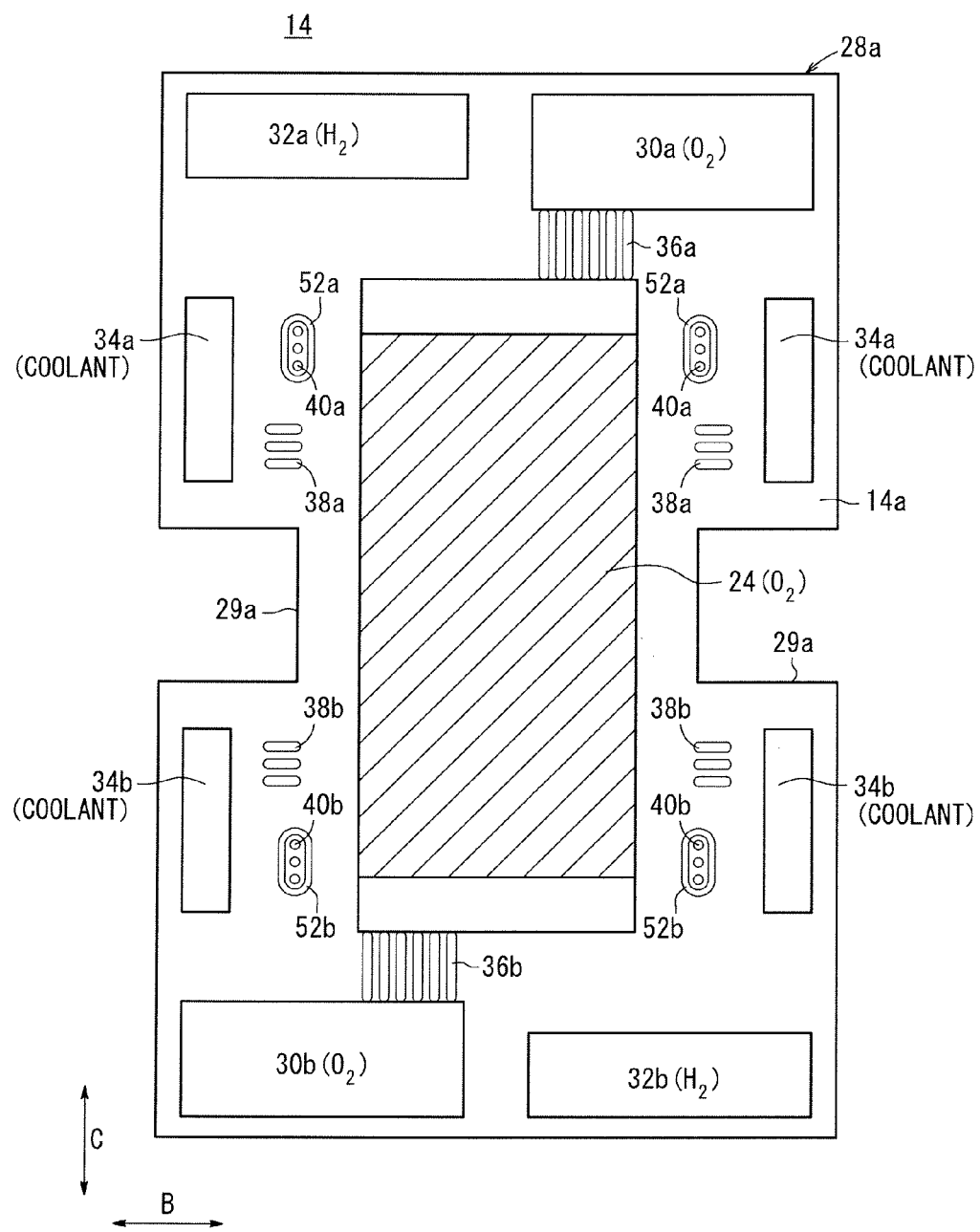
FIG. 3 is a view showing a cathode surface of a first membrane electrode assembly of the fuel cell.

As shown in FIG. 3, the frame 28a has a plurality of inlet grooves 36a at upper positions of the cathode surface (the surface where the cathode 24 is provided) 14a of the first membrane electrode assembly 14 and adjacent to the lower side of the oxygen-containing gas supply passage 30a. Further, the frame 28a has a plurality of inlet grooves 38a at upper positions at both ends of the cathode surface 14a in the width direction indicated by the arrow B and adjacent to the lower side of the coolant supply passages 34a. A plurality of inlet holes 40a extend through the frame 28a at positions adjacent to the upper side of the coolant supply passages 34a.

The frame 28a has a plurality of outlet grooves 36b at lower positions of the cathode surface 14a of the first membrane electrode assembly 14 and adjacent to the upper side of the oxygen-containing gas discharge passage 30b. Further, the frame 28a has a plurality of outlet grooves 38b at lower positions at both ends of the cathode surface 14a in the width direction and adjacent to the upper side of the coolant discharge passages 34b. A plurality of outlet holes 40b extend through the frame 28a at positions adjacent to the lower side of the coolant discharge passages 34b.

Figure 4:
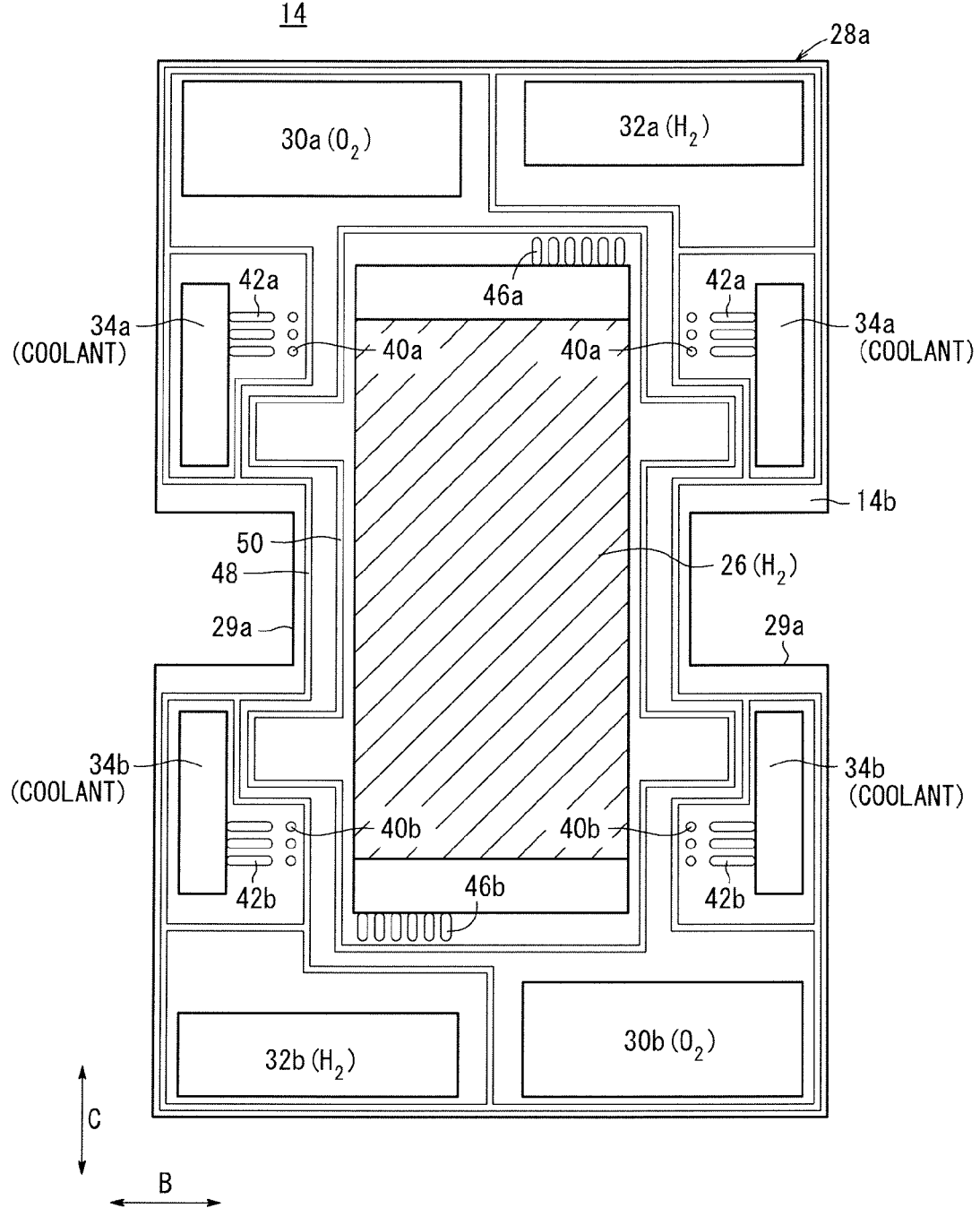
FIG. 4 is a view showing an anode surface of the first membrane electrode assembly.

As shown in FIG. 4, the frame 28a has a plurality of inlet grooves 42a at upper positions on both ends of the anode surface (the surface where the anode 26 is provided) 14b of the first membrane electrode assembly 14 in the width direction and adjacent to the upper side of the coolant supply passages 34a. The frame 28a has a plurality of outlet grooves 42b at lower positions on both ends of the anode surface 14b in the width direction and adjacent to lower portions of the coolant discharge passages 34b.

The frame 28a has a plurality of inlet grooves 46a below the fuel gas supply passage 32a, and a plurality of outlet grooves 46b above the fuel gas discharge passage 32b.

An outer seal member (outer seal line) 48 and an inner seal member (inner seal line) 50 are provided integrally with the anode surface 14b of the frame 28a. Alternatively, the outer seal member 48 and the inner seal member 50 may be formed separately from the frame 28a, and provided on the anode surface 14b of the frame 28a. Each of the outer seal member 48 and the inner seal member 50 is made of seal material, cushion material or packing material such as an EPDM rubber (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber. Seal members as described later have the same structure as those of the outer seal member 48 and the inner seal member 50, and description thereof will be omitted.

The outer seal member 48 is provided along the outer circumferential end of the frame 28a and around all of the fluid passages, i.e., the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b and around the reaction surface (power generation surface). The outer seal member 48 surrounds respectively the coolant supply passages 34a, the fuel gas supply passage 32a, the coolant discharge passages 34b and the fuel gas discharge passage 32b. The outer seal member 48 surrounds the inlet grooves 42a, the inlet holes 40a and the coolant supply passages 34a together, and surrounds the outlet grooves 42b, the outlet holes 40b and the coolant discharge passages 34b together.

The inner seal member 50 is positioned inside the outer seal member 48, and surrounds the anode 26, the inlet grooves 46a and the outlet grooves 46b together. The inner seal member 50 is provided along a profile line corresponding to the outer shape of the first metal separator 16, and contacts the entire outer circumferential surface of the first metal separator 16 (within the separator surface). The outer seal member 48 is provided around the outer circumferential end of the first metal separator 16 (outside the separator surface). All of the fluid passages are hermetically surrounded by the outer seal member 48 and the inner seal member 50.

As shown in FIG. 3, on the cathode surface 14a of the frame 28a, a ring-shaped inlet seal member 52a surrounding the inlet holes 40a and a ring-shaped outlet seal member 52b surrounding the outlet holes 40b are provided.

Figure 5:
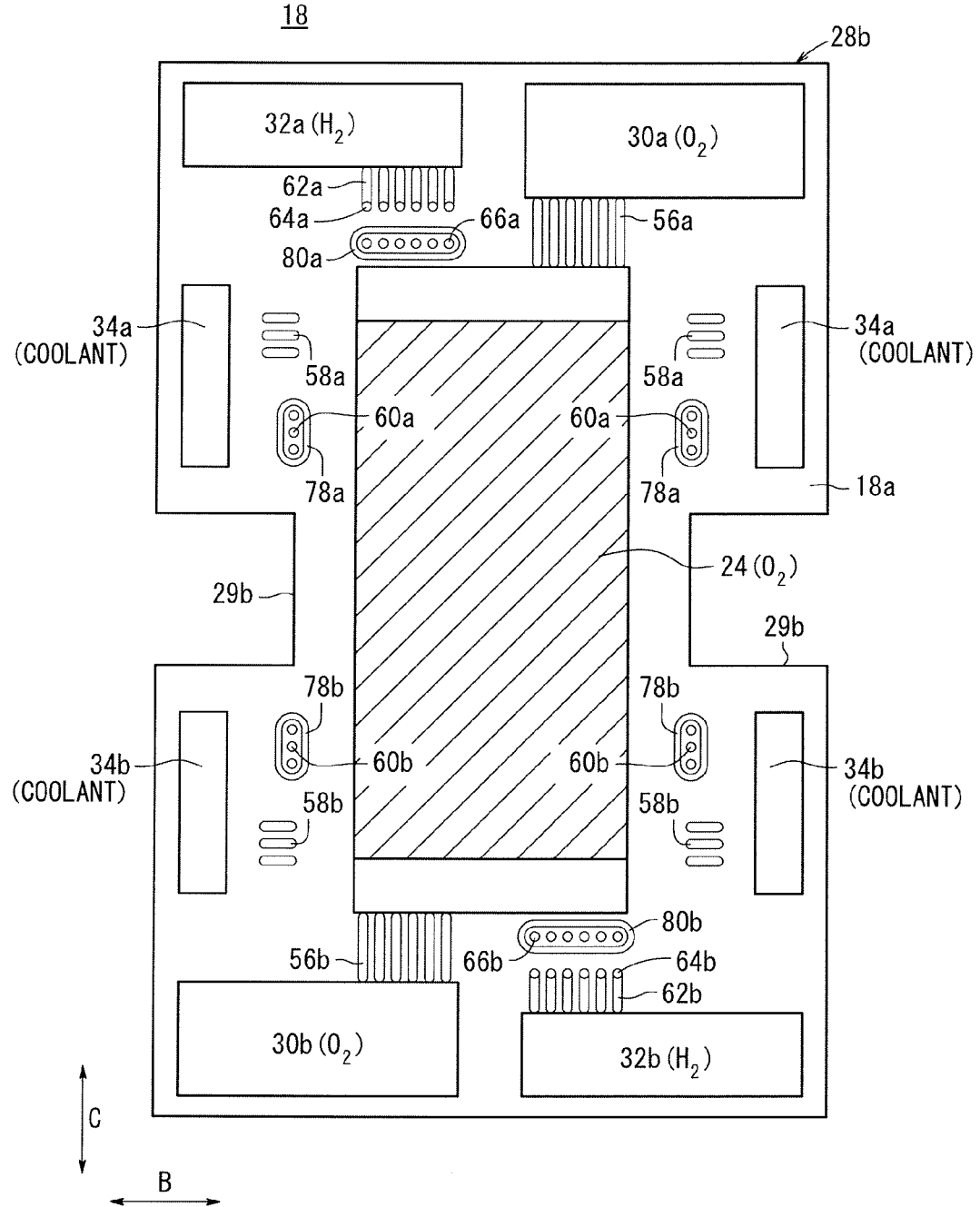
FIG. 5 is a view showing a cathode surface of a second membrane electrode assembly of the fuel cell.

As shown in FIG. 5, the frame 28b has a plurality of inlet grooves 56a at upper positions of the cathode surface (the surface where the cathode 24 is provided) 18a of the second membrane electrode assembly 18 and adjacent to the lower side of the oxygen-containing gas supply passage 30a.

The frame 28b has a plurality of inlet grooves 58a at upper positions on both ends of the cathode surface 18a in the width direction and adjacent to the upper side of the coolant supply passages 34a. A plurality of inlet holes 60a are formed adjacent to the lower side of the coolant supply passages 34a. The inlet holes 60a of the second membrane electrode assembly 18 are offset from the inlet holes 40a of the first membrane electrode assembly 14 such that the inlet holes 60a and the inlet holes 40a are not overlapped with each other in the stacking direction.

The frame 28b has a plurality of inlet grooves 62a at upper positions of the cathode surface 18a and adjacent to the lower side of the fuel gas supply passage 32a. A plurality of inlet holes 64a extend through the frame 28b at the lower ends of the inlet grooves 62a. A plurality of inlet holes 66a extend through the frame 28b below the inlet holes 64a and at positions spaced at predetermined distances from the inlet holes 64a.

The frame 28b has a plurality of outlet grooves 58b at lower positions on both ends of the cathode surface 18a in the width direction and adjacent to the lower side of the coolant discharge passages 34b. A plurality of outlet holes 60b are formed adjacent to the upper side of the coolant discharge passages 34b. The outlet holes 60b of the second membrane electrode assembly 18 are offset from the outlet holes 40b of the first membrane electrode assembly 14 such that the outlet holes 60b and the outlet holes 40b are not overlapped with each other in the stacking direction.

The frame 28b has a plurality of outlet grooves 62b at lower positions of the cathode surface 18a and adjacent to the upper side of the fuel gas discharge passage 32b. A plurality of outlet holes 64b extend through the frame 28b at the upper ends of the outlet grooves 62b. A plurality of outlet holes 66b extend through the frame 28b above the outlet holes 64b and at positions spaced at predetermined distances from the outlet holes 64b.

Figure 6:
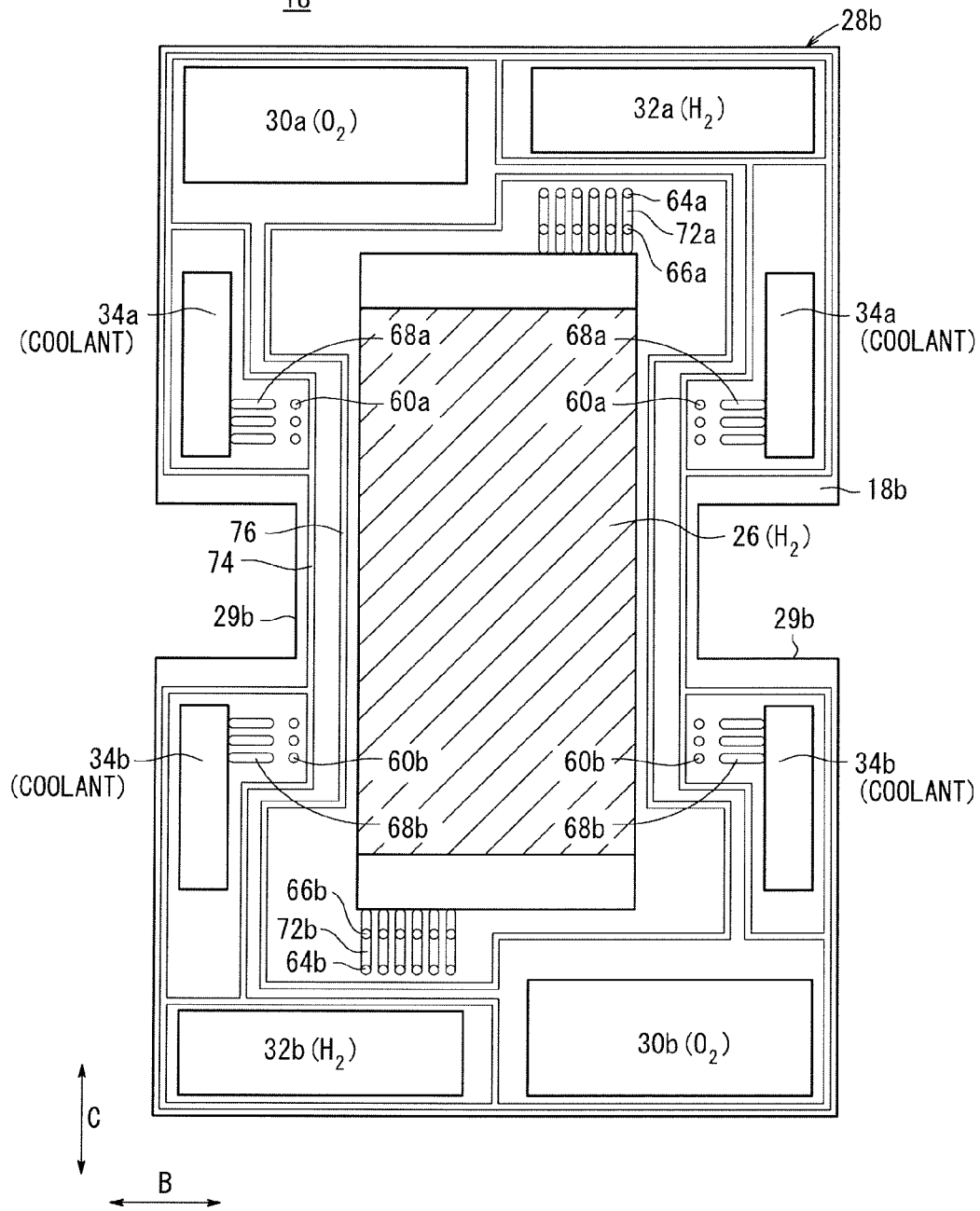
FIG. 6 is a view showing an anode surface of the second membrane electrode assembly.

As shown in FIG. 6, the frame 28b has a plurality of inlet grooves 68a at upper positions on both sides of the anode surface (the surface where the anode 26 is provided) 18b of the second membrane electrode assembly 18 in the width direction and adjacent to the lower side of the coolant supply passages 34a. The frame 28b has a plurality of inlet grooves 72a below the fuel gas supply passage 32a. The inlet grooves 72a connect the inlet holes 64a, 66a with each other.

The frame 28b has a plurality of outlet grooves 68b at lower positions on both ends of the anode surface 18b in the width direction and adjacent to the upper side of the coolant discharge passages 34b. The frame 28b has a plurality of outlet grooves 72b above the fuel gas discharge passage 32b. The outlet grooves 72b connect the outlet holes 64b, 66b with each other.

An outer seal member (outer seal line) 74 and an inner seal member (inner seal line) 76 are provided integrally with the anode surface 18b of the frame 28b. Alternatively, the outer seal member 74 and the inner seal member 76 may be formed separately from the frame 28b, and provided on the anode surface 18b of the frame 28b. The outer seal member 74 is provided along the outer circumferential end of the frame 28b and around all of the fluid passages, i.e., the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b.

The outer seal member 74 surrounds the coolant supply passages 34a, the fuel gas supply passage 32a, the coolant discharge passages 34b and the fuel gas discharge passage 32b. The outer seal member 74 surrounds the inlet grooves 68a, the inlet holes 60a and the coolant supply passages 34a together, and surrounds the outlet grooves 68b, the outlet holes 60b and the coolant discharge passages 34b together.

The inner seal member 76 is positioned inside the outer seal member 74, and surrounds the anode 26, the inlet holes 64a, 66a, the inlet grooves 72a, the outlet holes 64b, 66b and the outlet grooves 72b together. The inner seal member 76 is provided along a profile line corresponding to the outer shape of the second metal separator 20, and contacts the entire outer circumferential surface of the second metal separator 20. The outer seal member 74 is provided around the second metal separator 20. All of the fluid passages are hermetically surrounded by the outer seal member 74 and the inner seal member 76.

As shown in FIG. 5, on the cathode surface 18a of the frame 28b, ring-shaped inlet seal members 78a, 80a surrounding the inlet holes 60a, 66a and ring-shaped outlet seal members 78b, 80b surrounding the outlet holes 60b, 66b are provided.

The first and second metal separators 16, 20 are dimensioned such that the first and second metal separators 16, 20 are provided inside the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b (all of the fluid passages).

As shown in FIG. 2, the first metal separator 16 includes two metal plates (e.g., stainless plates) 82a, 82b having the same outer shape. The metal plates 82a, 82b are stacked together. The outer circumferential edges of the metal plates 82a, 82b are welded or bonded together, and the internal space between the metal plates 82a, 82b is closed hermetically. An oxygen-containing gas flow field 84 facing the cathode 24 is formed on the metal plate 82a, and a fuel gas flow field 86 facing the anode 26 is formed on the metal plate 82b. A coolant flow field 88 is formed between the metal plates 82a, 82b.

Figure 7:
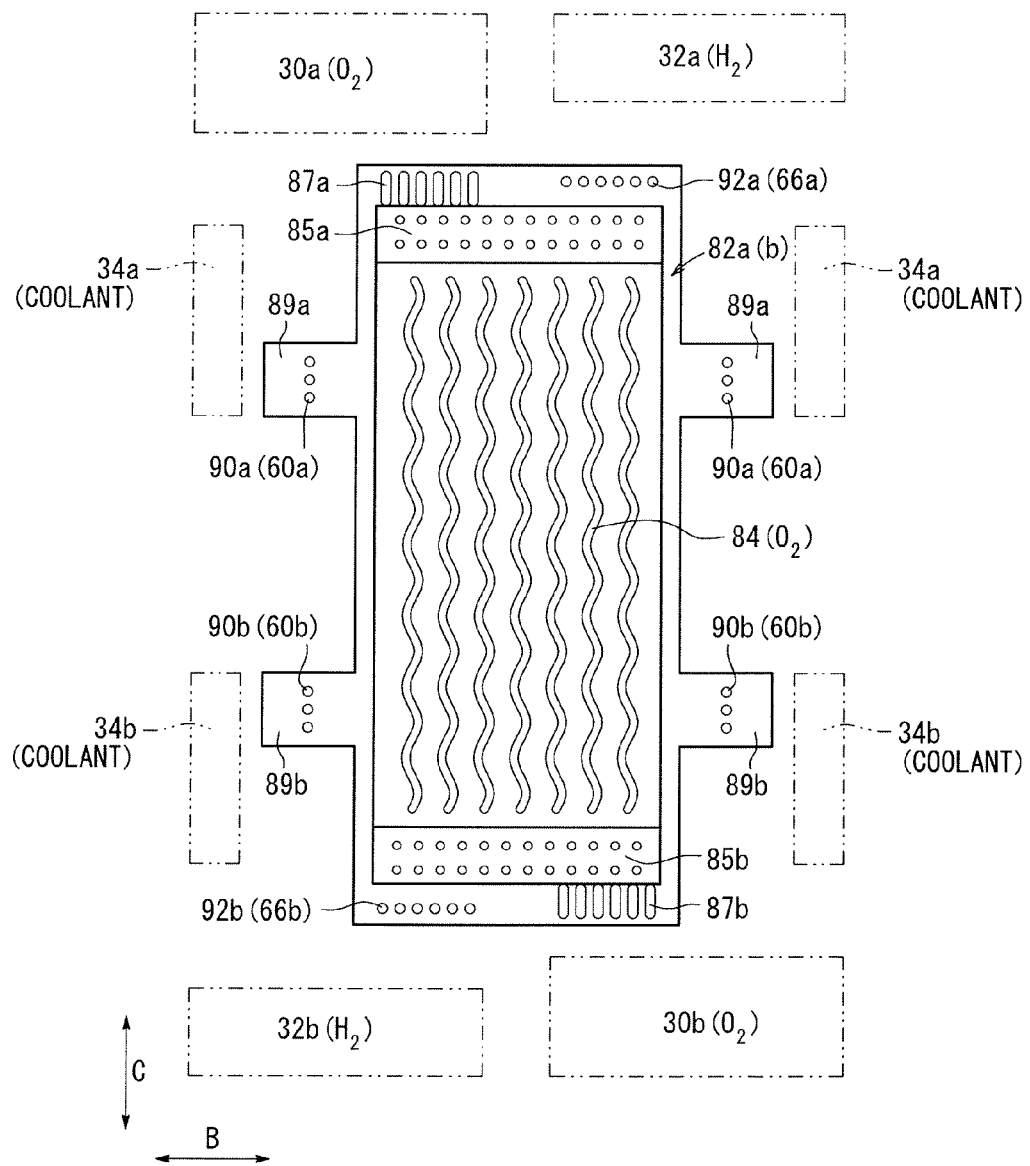
FIG. 7 is a view showing a cathode surface of a first metal separator of the fuel cell.

As shown in FIG. 7, the first metal separator 16 has the oxygen-containing gas flow field 84 in a surface of the metal plate 82a, and which includes a plurality of wavy flow grooves extending in the vertical direction indicated by the arrow C. An inlet buffer 85a is provided on the upstream side of the oxygen-containing gas flow field 84, and an outlet buffer 85b is provided on the downstream side of the oxygen-containing gas flow field 84. A plurality of inlet grooves 87a are formed above the inlet buffer 85a and below the oxygen-containing gas supply passage 30a, and a plurality of outlet grooves 87b are formed below the outlet buffer 85b and above the oxygen-containing gas discharge passage 30b.

The first metal separator 16 has a rectangular shape elongated in a direction indicated by an arrow C. At both ends in a lateral direction indicated by an arrow B, a pair of projections 89a protruding toward lower portions of the coolant supply passages 34a, and a pair of projections 89b protruding toward upper portions of the coolant discharge passages 34b are provided. In the metal plate 82a, a plurality of holes 90a are formed in the projections 89a, and the holes 90a are connected to the inlet holes 60a of the second membrane electrode assembly 18. Further, in the metal plate 82a, a plurality of holes 90b are formed in the projections 89b, and the holes 90b are connected to the outlet holes 60b of the second membrane electrode assembly 18.

A plurality of holes 92a are formed at upper positions of the metal plate 82a, and the holes 92a are connected to the inlet holes 66a of the second membrane electrode assembly 18. A plurality of holes 92b are formed at lower positions of the metal plate 82a, and the holes 92b are connected to the outlet holes 66b of the second membrane electrode assembly 18. The holes 92a, 92b are also formed in the metal plate 82b, and extend through the first metal separator 16.

Figure 8:
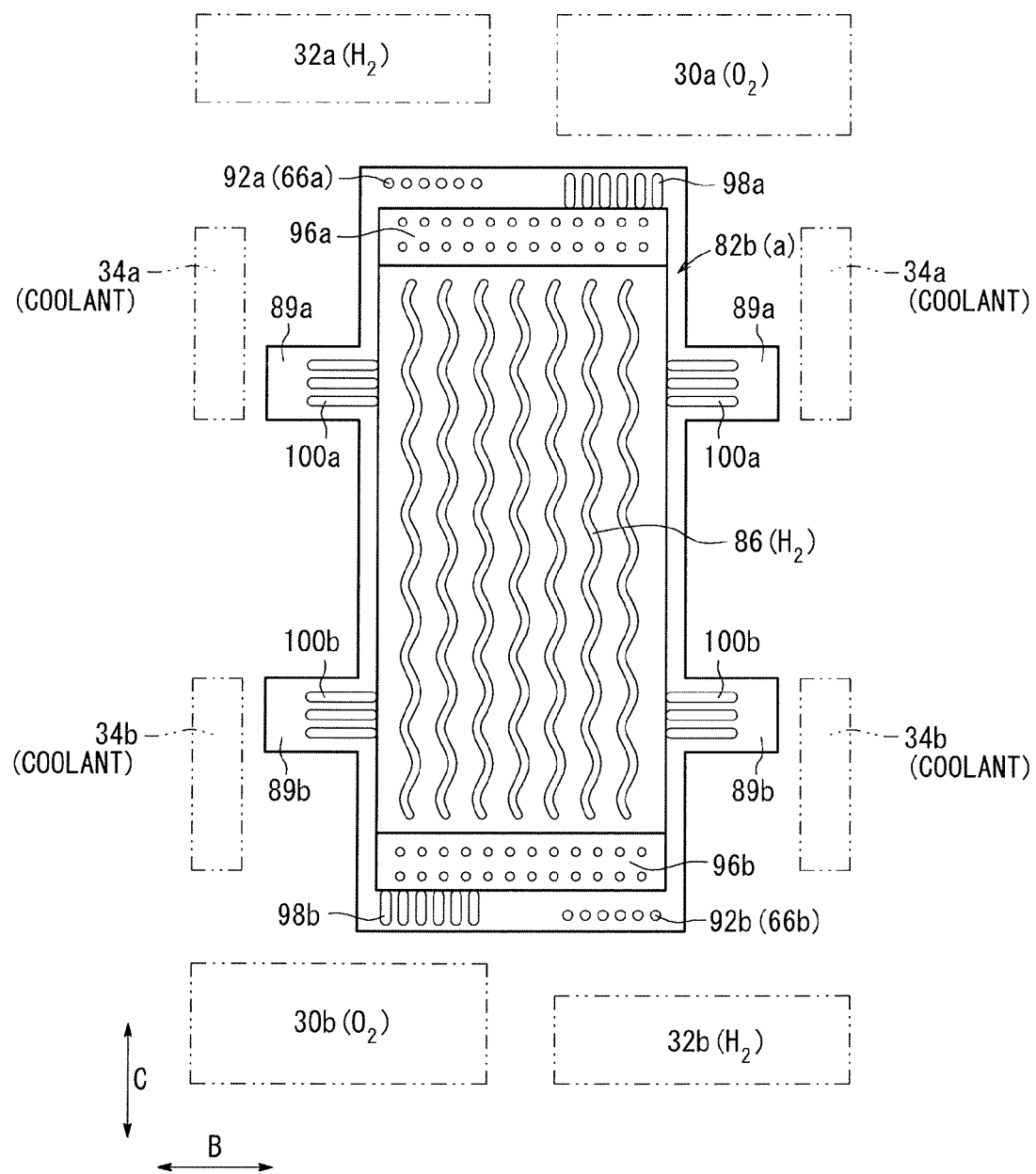
FIG. 8 is a view showing an anode surface of the first metal separator.

As shown in FIG. 8, the first metal separator 16 has the fuel gas flow field 86 in a surface of the metal plate 82b and which includes a plurality of wavy flow grooves extending in a vertical direction indicated by the arrow C. An inlet buffer 96a is provided on the upstream side of the fuel gas flow field 86, and an outlet buffer 96b is provided on the downstream side of the fuel gas flow field 86. A plurality of inlet grooves 98a are formed above the inlet buffer 96a and below the oxygen-containing gas supply passage 30a, and a plurality of outlet grooves 98b are formed below the outlet buffer 96b and above the oxygen-containing gas discharge passage 30b.

A plurality of inlet grooves 100a are formed in the projections 89a and adjacent to the lower portions of the coolant supply passages 34a. A plurality of outlet grooves 100b are formed in the projections 89b and adjacent to the upper portions of the coolant discharge passages 34b.

As shown in FIG. 2, the second metal separator 20 includes two metal plates (e.g., stainless plates) 102a, 102b having the same outer shape. The metal plates 102a, 102b are stacked together. The outer circumferential edges of the metal plates 102a, 102b are welded or bonded together, and the internal space between the metal plates 102a, 102b is closed hermetically. An oxygen-containing gas flow field 84 facing the cathode 24 is formed on the metal plate 102a, and a fuel gas flow field 86 facing the anode 26 is formed on the metal plate 102b. A coolant flow field 88 is formed between the metal plates 102a, 102b.

Figure 9:
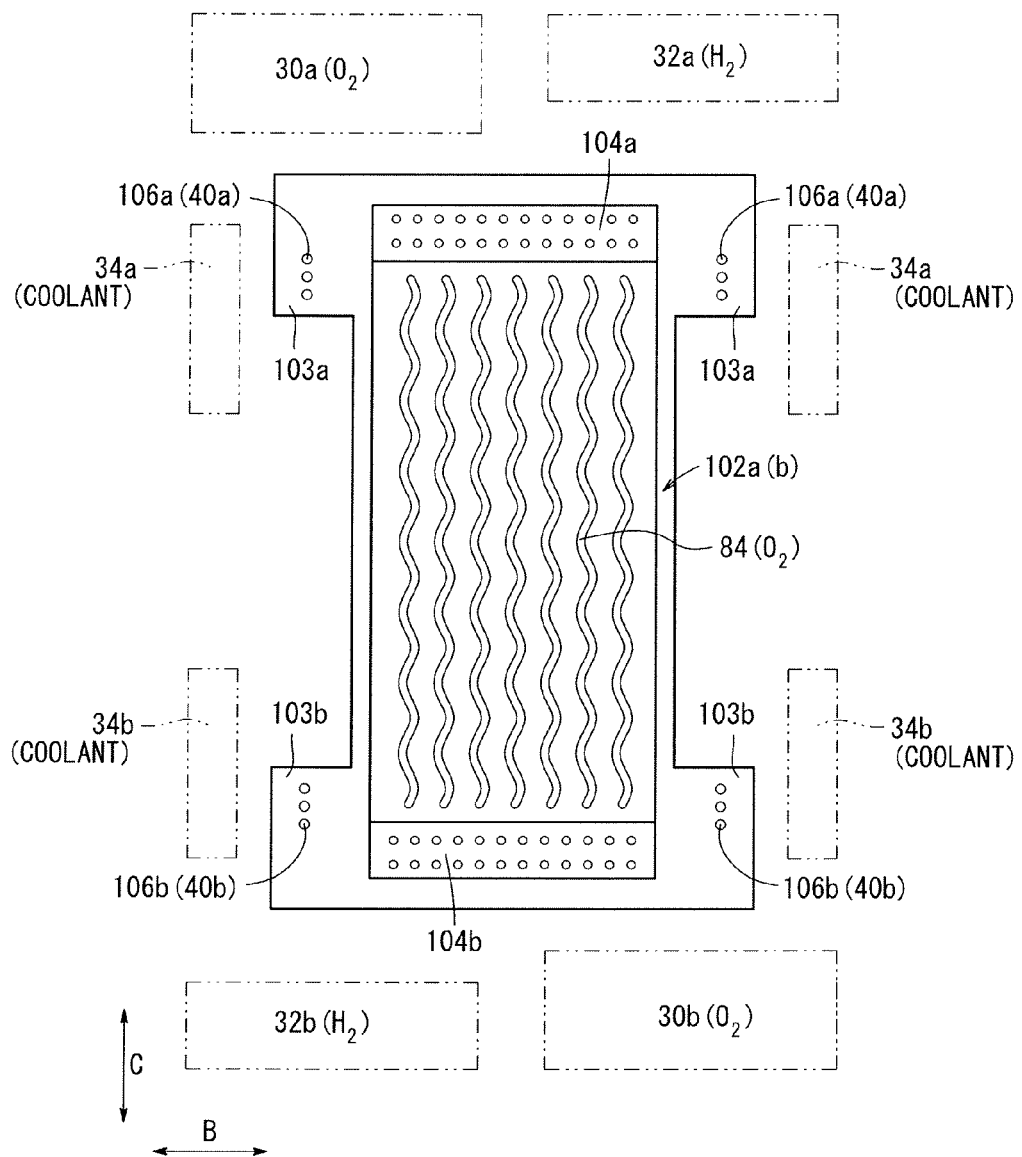
FIG. 9 is a view showing a cathode surface of a second metal separator of the fuel cell.

As shown in FIG. 9, the second metal separator 20 has pairs of projections 103a, 103b at both ends in the direction indicated by the arrow C. The projections 103a, 103b protrude outwardly in the direction indicated by the arrow B. The oxygen-containing gas flow field 84 is provided in the surface of the metal plate 102a. The oxygen-containing gas flow field 84 includes a plurality of flow grooves extending in the vertical direction indicated by the arrow C. An inlet buffer 104a is provided on the upstream side of the oxygen-containing gas flow field 84, and an outlet buffer 104b is provided on the downstream side of the oxygen-containing gas flow field 84.

In the metal plate 102a, a plurality of holes 106a are formed in the projections 103b and adjacent to upper portions of the coolant supply passages 34a. The holes 106a are connected to the inlet holes 40a of the first membrane electrode assembly 14. Further, in the metal plate 102a, a plurality of holes 106b are formed in the projections 103b and adjacent to lower portions of the coolant discharge passages 34b. The holes 106b are connected to the outlet holes 40b of the first membrane electrode assembly 14.

Figure 10:
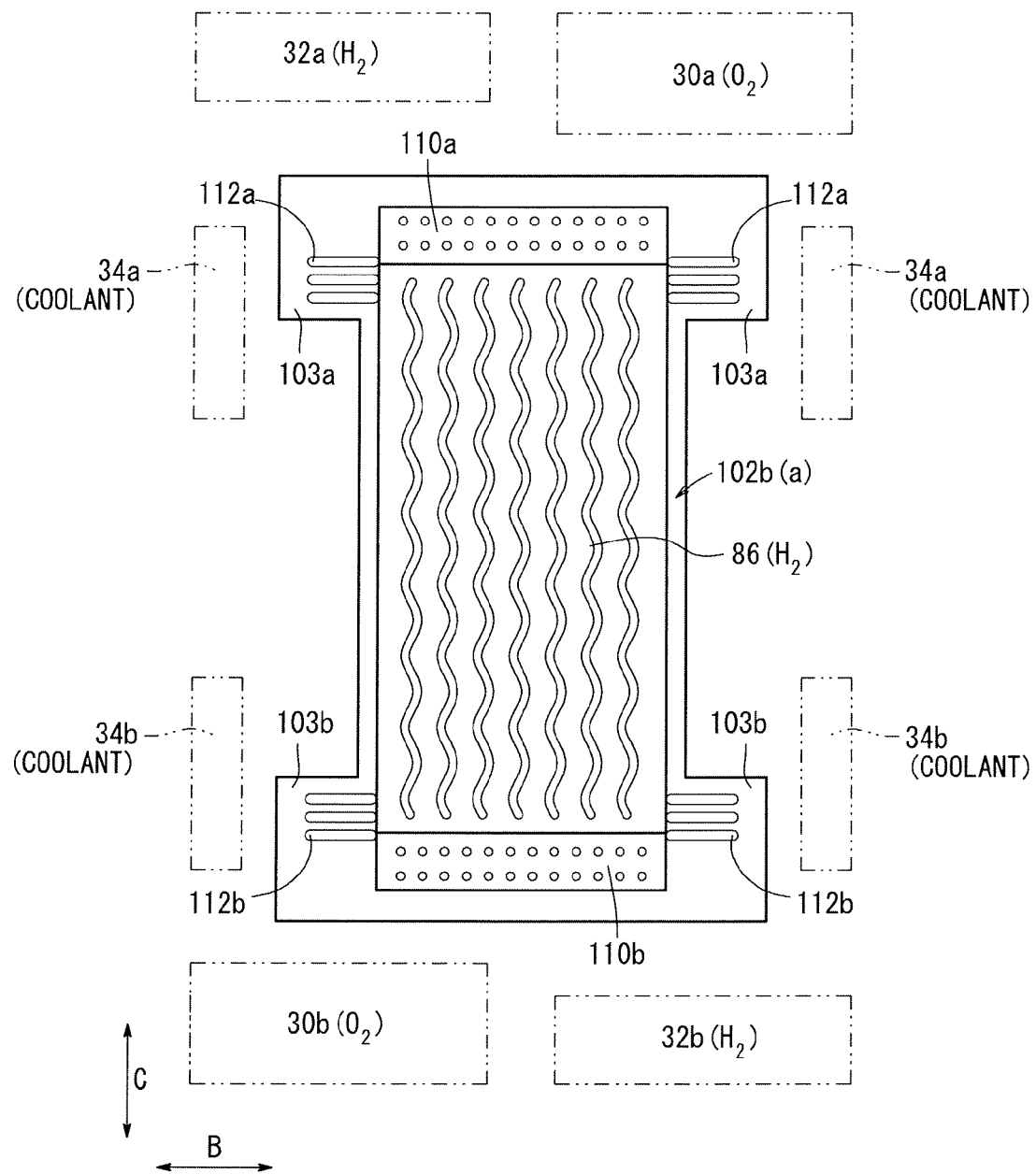
FIG. 10 is a view showing an anode surface of the second metal separator.

As shown in FIG. 10, the second metal separator 20 has the fuel gas flow field 86 in a surface of the metal plate 102b. The fuel gas flow field 86 includes a plurality of flow grooves extending in the vertical direction indicated by the arrow C. An inlet buffer 110a is provided on the upstream side of the fuel gas flow field 86, and an outlet buffer 110b is provided on the downstream side of the fuel gas flow field 86.

A plurality of inlet grooves 112a are formed in the projections 103a of the metal plate 102b and adjacent to the upper side of the coolant supply passages 34a, and a plurality of outlet grooves 112b are formed in the projections 103b of the metal plate 102b and adjacent to the lower side of the coolant discharge passages 34b. Both of the inlet grooves 112a and the outlet grooves 112b have corrugated structure to form coolant channels in the second metal separator 20.

Figure 11:
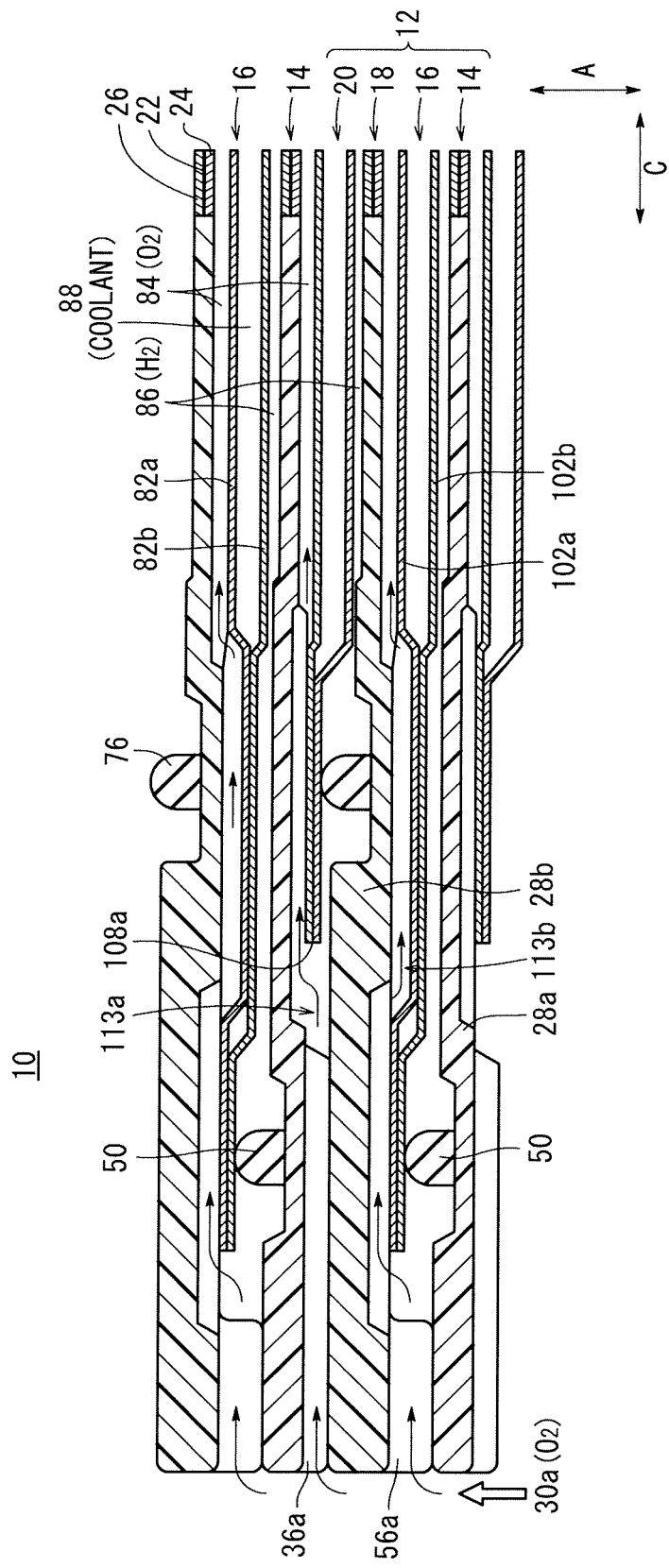
FIG. 11 is a cross sectional view showing the fuel cell, taken along a line XI-XI in FIG. 1.

As shown in FIG. 11, an oxygen-containing gas connection channel 113a and an oxygen-containing gas connection channel 113b are formed between the frames 28a, 28b that are adjacent to each other in the stacking direction. The oxygen-containing gas connection channel 113a connects the oxygen-containing gas supply passage 30a with the oxygen-containing gas flow field 84 of the second membrane electrode assembly 18, and the oxygen-containing gas connection channel 113b connects the oxygen-containing gas supply passage 30a with the oxygen-containing gas flow field 84 of the first membrane electrode assembly 14. Though not shown, an oxygen-containing gas connection channel connecting the oxygen-containing gas discharge passage 30b with the oxygen-containing gas flow field 84 is formed between the frames 28a, 28b.

Figure 12:
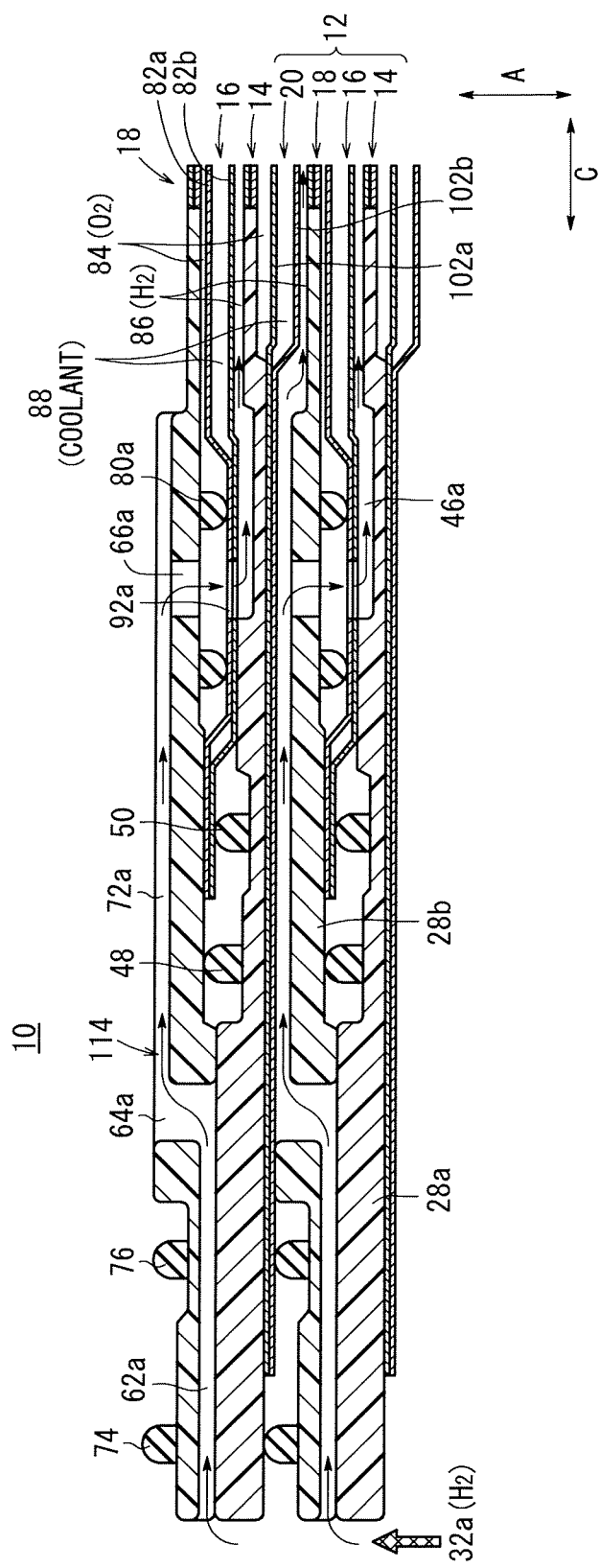
FIG. 12 is a cross sectional view showing the fuel cell, taken along a line XII-XII in FIG. 1.

As shown in FIG. 12, a fuel gas connection channel 114 is formed between the frames 28a, 28b that are adjacent to each other in the stacking direction. The fuel gas connection channel 114 connects the fuel gas supply passage 32a with the fuel gas flow field 86. Though not shown, a fuel gas connection channel connecting the fuel gas discharge passage 32b with the fuel gas flow field 86 is formed between the frames 28a, 28b.

Figure 13:
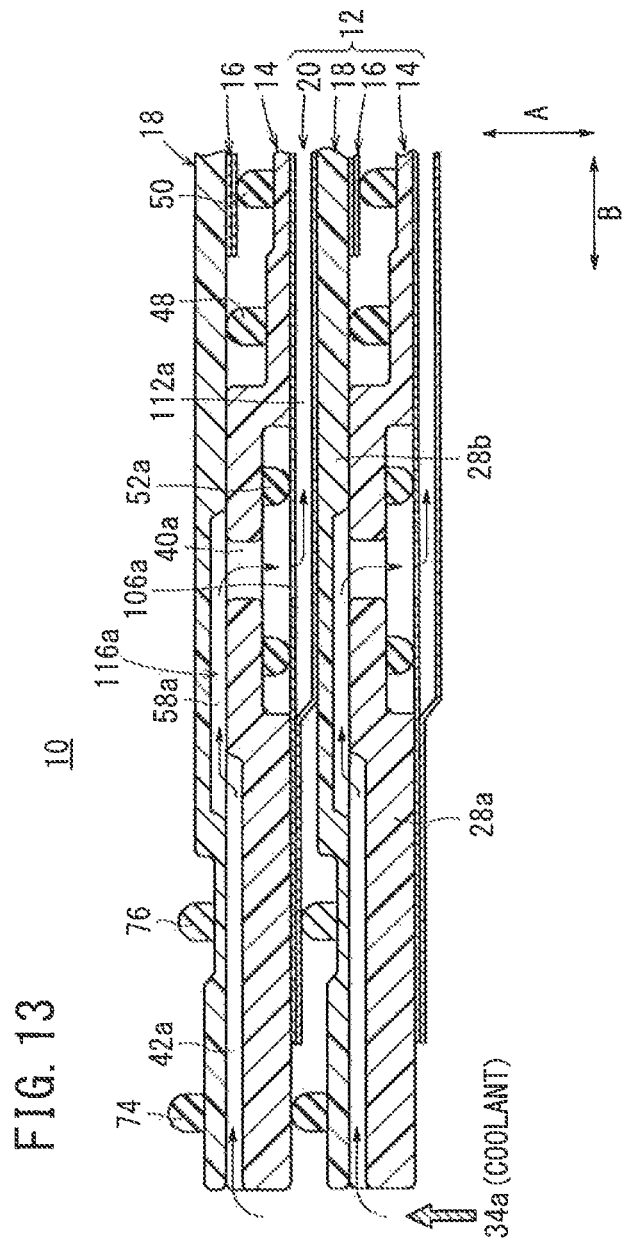
FIG. 13 is a cross sectional view showing the fuel cell, taken along a line XIII-XIII in FIG. 1.
Figure 14:
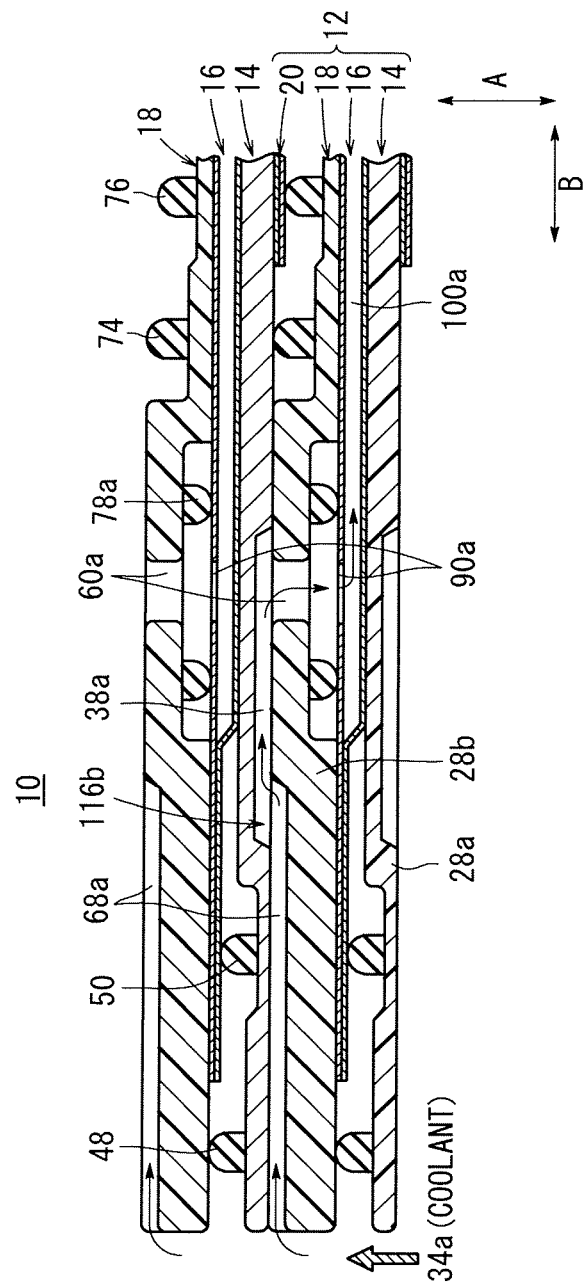
FIG. 14 is a cross sectional view showing the fuel cell, taken along a line XIV-XIV in FIG. 1.

As shown in FIGS. 13 and 14, a coolant connection channel 116a and a coolant connection channel 116b are formed between the frames 28a, 28b that are adjacent to each other in the stacking direction. The coolant connection channel 116a connects the coolant supply passage 34a with the coolant flow field 88 of the second metal separator 20. The coolant connection channel 116b connects the coolant supply passage 34a with the coolant flow field 88 of the first metal separator 16. Though not shown, a coolant connection channel connecting the coolant discharge passage 34b with the coolant flow field 88 is formed between the frames 28a, 28b.

The coolant connection channels 116a, 116b are formed by placing the outer seal member 48 and the inner seal member 50 of the frame 28a, and the outer seal member 74 and the inner seal member 76 of the frame 28b at different positions in the stacking direction.

As shown in FIG. 13, the coolant connection channel 116a includes the inlet grooves 42a, 58a provided along the separator surface, the inlet holes (first holes) 40a formed in the frame 28a in the stacking direction, and the holes (second holes) 106a formed in the metal plate 102a of the second metal separator 20 in the stacking direction. Ends of the inlet grooves 42a and ends of the inlet grooves 58a are connected together.

As shown in FIG. 14, the coolant connection channel 116b includes the inlet grooves 68a, 38a provided along the separator surface, the inlet holes (first holes) 60a formed in the frame 28b in the stacking direction, and the holes (second holes) 90a formed in the metal plate 82a of the first metal separator 16 in the stacking direction. Ends of the inlet grooves 68a and ends of the inlet grooves 38a are connected together.

The inlet holes 40a and the holes 106a of the frame 28a and the inlet holes 60 and the holes 90a of the frame 28b are not overlapped with each other in the stacking direction.

Operation of this fuel cell 10 will be described below.

As shown in FIG. 1, an oxygen-containing gas is supplied to the oxygen-containing gas supply passage 30a, and a fuel gas such as a hydrogen-containing gas is supplied to the fuel gas supply passage 32a. Further, a coolant such as pure water, ethylene glycol or the like is supplied to the pair of coolant supply passages 34a.

In each of the cell units 12, as shown in FIGS. 1 and 11, the oxygen-containing gas supplied to the oxygen-containing gas supply passage 30a flows into the inlet grooves 36a of the first membrane electrode assembly 14 and into the inlet grooves 56a of the second membrane electrode assembly 18.

The oxygen-containing gas from the inlet grooves 36a is supplied to the oxygen-containing gas flow field 84 of the second metal separator 20. Then, the oxygen-containing gas is supplied from the oxygen-containing gas flow field 84 to the cathode 24 of the first membrane electrode assembly 14. After the oxygen-containing gas is consumed in the power generation reaction, the remaining oxygen-containing gas is discharged through the outlet grooves 36b into the oxygen-containing gas discharge passage 30b.

In the meanwhile, the oxygen-containing gas from the inlet grooves 56a flows through the inlet grooves 87a between the second membrane electrode assembly 18 and the first metal separator 16, and then, the oxygen-containing gas is supplied to the oxygen-containing gas flow field 84 of the first metal separator 16. The oxygen-containing gas from the oxygen-containing gas flow field 84 is supplied to the cathode 24 of the second membrane electrode assembly 18. After the oxygen-containing gas is consumed in the power generation reaction, the remaining oxygen-containing gas is discharged through the outlet grooves 87b, 56b into the oxygen-containing gas discharge passage 30b.

Further, as shown in FIGS. 1 and 12, the fuel gas supplied to the fuel gas supply passage 32a flows into the inlet grooves 62a at the cathode 24 of the second membrane electrode assembly 18. The fuel gas from the inlet grooves 62a moves toward the anode 26 through the inlet holes 64a, and then, the fuel gas is partially supplied from the inlet grooves 72a to the fuel gas flow field 86 of the second metal separator 20.

The remaining fuel gas flows through the inlet holes 66a and the holes 92a of the first metal separator 16, and then, flows into between the first metal separator 16 and the first membrane electrode assembly 14. Thereafter, the fuel gas is supplied to the fuel gas flow field 86 of the first metal separator 16.

After the fuel gas is consumed in the power generation reaction in the fuel gas flow field 86 of the second metal separator 20, the fuel gas is discharged into the outlet grooves 72b. Then, the fuel gas is discharged from the outlet holes 64b through the outlet grooves 62b into the fuel gas discharge passage 32b. In the meanwhile, after the fuel gas is consumed in the power generation reaction in the fuel gas flow field 86 of the first metal separator 16, the fuel gas is discharged from the holes 92b through the outlet holes 66b into the outlet grooves 72b. Then, likewise, the fuel gas is discharged into the fuel gas discharge passage 32b.

Thus, in each of the first membrane electrode assembly 14 and the second membrane electrode assembly 18, the oxygen-containing gas supplied to the cathode 24 and the fuel gas supplied to the anode 26 are consumed in electrochemical reactions at catalyst layers of the cathode 24 and the anode 26 for generating electricity.

Further, as shown in FIGS. 1 and 13, the coolant supplied to the pair of the coolant supply passages 34a partially flows into the inlet grooves 42a of the first membrane electrode assembly 14, and then, the coolant is supplied from the inlet grooves 58a to the inlet holes 40a. The coolant from the inlet holes 40a flows through the holes 106a of the second metal separator 20 into the second metal separator 20.

The coolant flows inside the second metal separator 20 along the inlet grooves 112a from both sides inwardly toward each other in the direction indicated by the arrow B, and the coolant is supplied to the coolant flow field 88. The coolant flowing from both sides toward each other inwardly collides at the center of the coolant flow field 88 in the direction indicated by the arrow B, and moves downwardly, in the direction of gravity indicated by the arrow C. Then, the coolant is distributed toward both sides in the direction indicated by the arrow B at a lower portion of the coolant flow field 88. The coolant flows from the outlet grooves 112b through the holes 106b, and the coolant is discharged from the second metal separator 20. Further, the coolant flows from the outlet holes 40b to the outlet grooves 58b, 42b, and the coolant is discharged into the coolant discharge passages 34b.

In the meanwhile, as shown in FIGS. 1 and 14, the remaining coolant supplied to the coolant supply passages 34a partially flows into the inlet grooves 68a of the second membrane electrode assembly 18, and then, the coolant flows through the inlet grooves 38a to the inlet holes 60a. The coolant from the inlet holes 60a flows though the holes 90a of the first metal separator 16, and then, the coolant flows into the first metal separator 16.

The coolant flows along the inlet grooves 100a inside the first metal separator 16 in the direction indicated by the arrow B, and flows inwardly from both sides in the direction indicated by the arrow B. Then, the coolant is supplied to the coolant flow field 88. After the coolant moves along the coolant flow field 88 in the direction of gravity indicated by the arrow C, the coolant is distributed toward both sides in the direction indicated by the arrow B. The coolant flows from the outlet grooves 100b to the holes 90b, and then, the coolant is discharged from the first metal separator 16. Further, the coolant from the outlet holes 60b flows through the outlet grooves 38b, 68b and then, the coolant is discharged into the coolant discharge passages 34b.

Thus, the first membrane electrode assembly 14 and the second membrane electrode assembly 18 are cooled by the coolant flowing through the coolant flow field 88 in the first metal separator 16 and the coolant flow field 88 in the second metal separator 20.

In the first embodiment, all of the fluid passages, i.e., the oxygen-containing gas supply passage 30a, the coolant supply passages 34a, the fuel gas supply passage 32a, the oxygen-containing gas discharge passage 30b, the coolant discharge passages 34b and the fuel gas discharge passage 32b extend through the frame 28a of the first membrane electrode assembly 14 and the frame 28b of the second membrane electrode assembly 18 in the stacking direction.

In the structure, no fluid passages are required in the first metal separator 16 and the second metal separator 20. The first metal separator 16 and the second metal separator 20 can be formed into a shape having outer dimensions which correspond to the power generation area. Thus, reduction in the size and weight of the first metal separator 16 and the second metal separator 20 can be achieved easily, and it becomes possible to reduce the production cost of the first metal separator 16 and the second metal separator 20.

Accordingly, the first metal separator 16 and the second metal separator 20 can be produced efficiently, and it becomes possible to obtain the entire fuel cell 10 economically.

Further, in the first embodiment, the oxygen-containing gas supply passage 30a, the fuel gas supply passage 32a, the oxygen-containing gas discharge passage 30b and the fuel gas discharge passage 32b are provided in one pair of sides (short sides) of each of the frames 28a, 28b, and only the coolant supply passages 34a and the coolant discharge passages 34b are provided in the other pair of sides (long sides) of each frame 28a, 28b.

Accordingly, in the cell unit 12, the width of the one pair of sides, i.e., the width of the short sides in the direction indicated by the arrow B is reduced as much as possible, and it becomes possible to install the fuel cell 10 more easily.

Further, the coolant supply passages 34a and the coolant discharge passages 34b are provided separately on the long sides. Therefore, the coolant can flows through the coolant flow field 88 more uniformly and reliably. It becomes possible to maintain the uniform humidity environment over the entire power generation area, and power generation can be performed efficiently.

Further, as shown in FIGS. 13 and 14, the coolant connection channel 116a connecting the coolant supply passages 34a with the coolant flow field 88 of the second metal separator 20, and the coolant connection channel 116b connecting the coolant supply passages 34a with the coolant flow field 88 of the first metal separator 16 are formed between the frames 28a, 28b that are adjacent to each other in the stacking direction.

The coolant connection channels 116a, 116b are formed by placing the outer seal member 48 and the inner seal member 50 of the frame 28a and the outer seal member 74 and the inner seal member 76 of the frame 28b at different positions in the stacking direction.

Specifically, as shown in FIG. 13, the coolant connection channel 116a includes the inlet grooves 42a, 58a provided along the separator surface, the inlet holes 40a formed in the frame 28a in the stacking direction, and the holes 106a formed in the metal plate 102a in the stacking direction. The ends of the inlet grooves 42a and the ends of the inlet grooves 58a are connected together.

As shown in FIG. 14, the coolant connection channel 116b includes the inlet grooves 68a, 38a provided along the separator surface, the inlet holes 60a formed in the frame 28b in the stacking direction, and the holes 90a formed in the metal plate 82a in the stacking direction. The ends of the inlet grooves 68a and the ends of the inlet grooves 38a are connected together.

The inlet holes 40a and the holes 106a of the frame 28a and the inlet holes 60a and the holes 90a of the frame 28b are not overlapped with each other in the stacking direction. Thus, the structure of the fuel cell 10 is simplified, and it becomes possible to reduce the overall size of the fuel cell 10 in the stacking direction.

Figure 15:
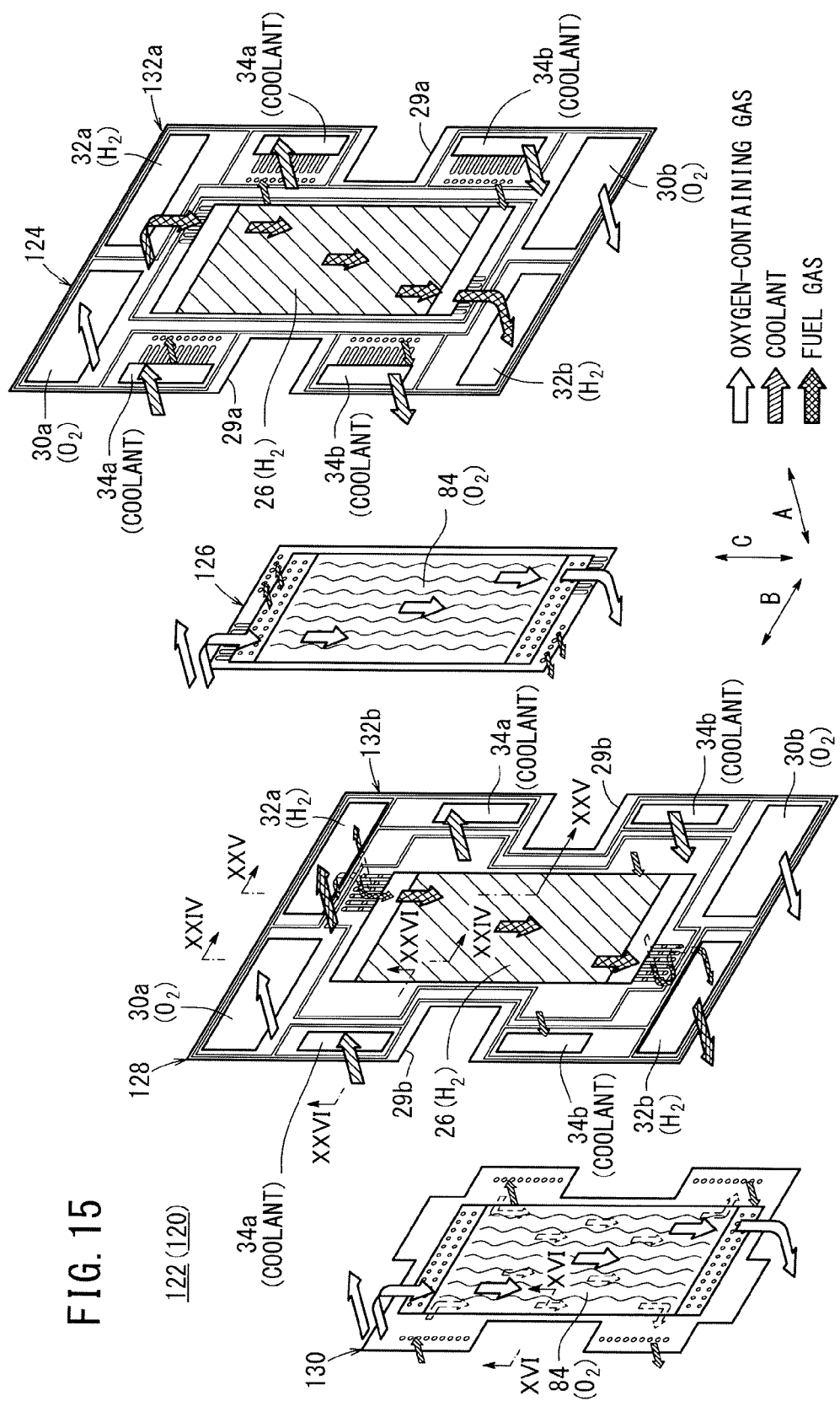
FIG. 15 is an exploded perspective view showing a fuel cell according to a second embodiment of the present invention.

FIG. 15 is an exploded perspective view showing a fuel cell 120 according to a second embodiment of the present invention. The constituent elements of the fuel cell 120 that are identical to those of the fuel cell 10 according to the first embodiment are labeled with the same reference numeral, and description thereof will be omitted.

Figure 16:
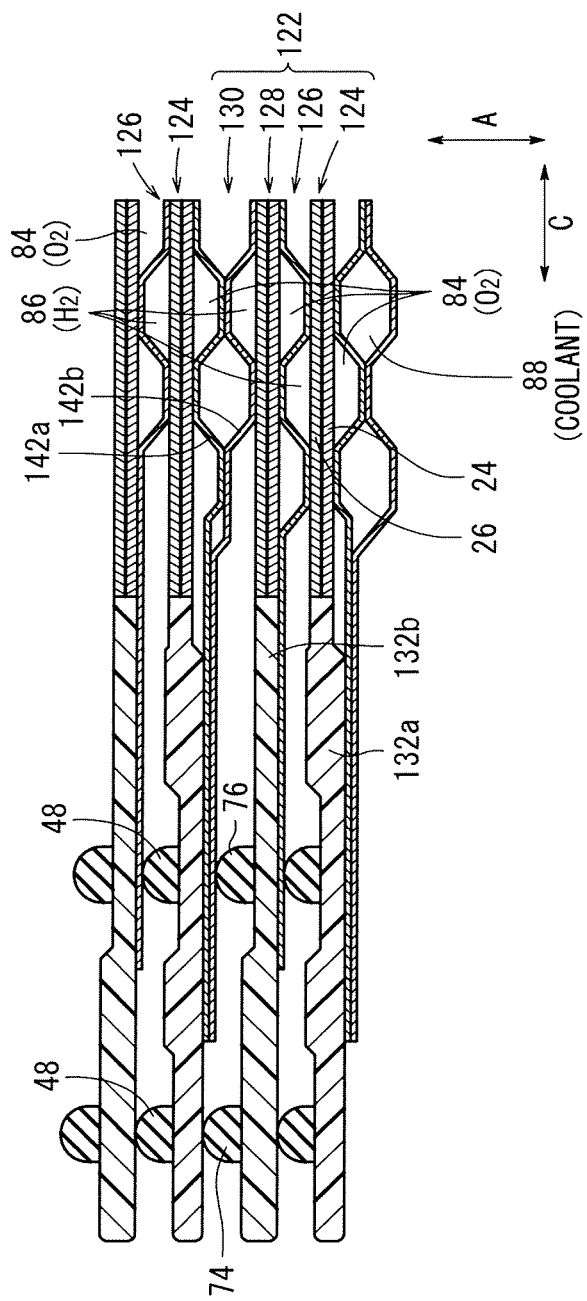
FIG. 16 is a cross sectional view showing the fuel cell, taken along a line XVI-XVI in FIG. 15.

As shown in FIGS. 15 and 16, the fuel cell 120 is formed by stacking a plurality of cell units 122, and each of the cell units 122 includes a first membrane electrode assembly (electrolyte electrode assembly) (MEA) 124, a first metal separator 126, a second membrane electrode assembly (electrolyte electrode assembly) (MEA) 128, and a second metal separator 130. The first membrane electrode assembly 124 and the second membrane electrode assembly 128 include a frame (resin frame member) 132a and a frame (resin frame member) 132b, respectively.

Figure 17:
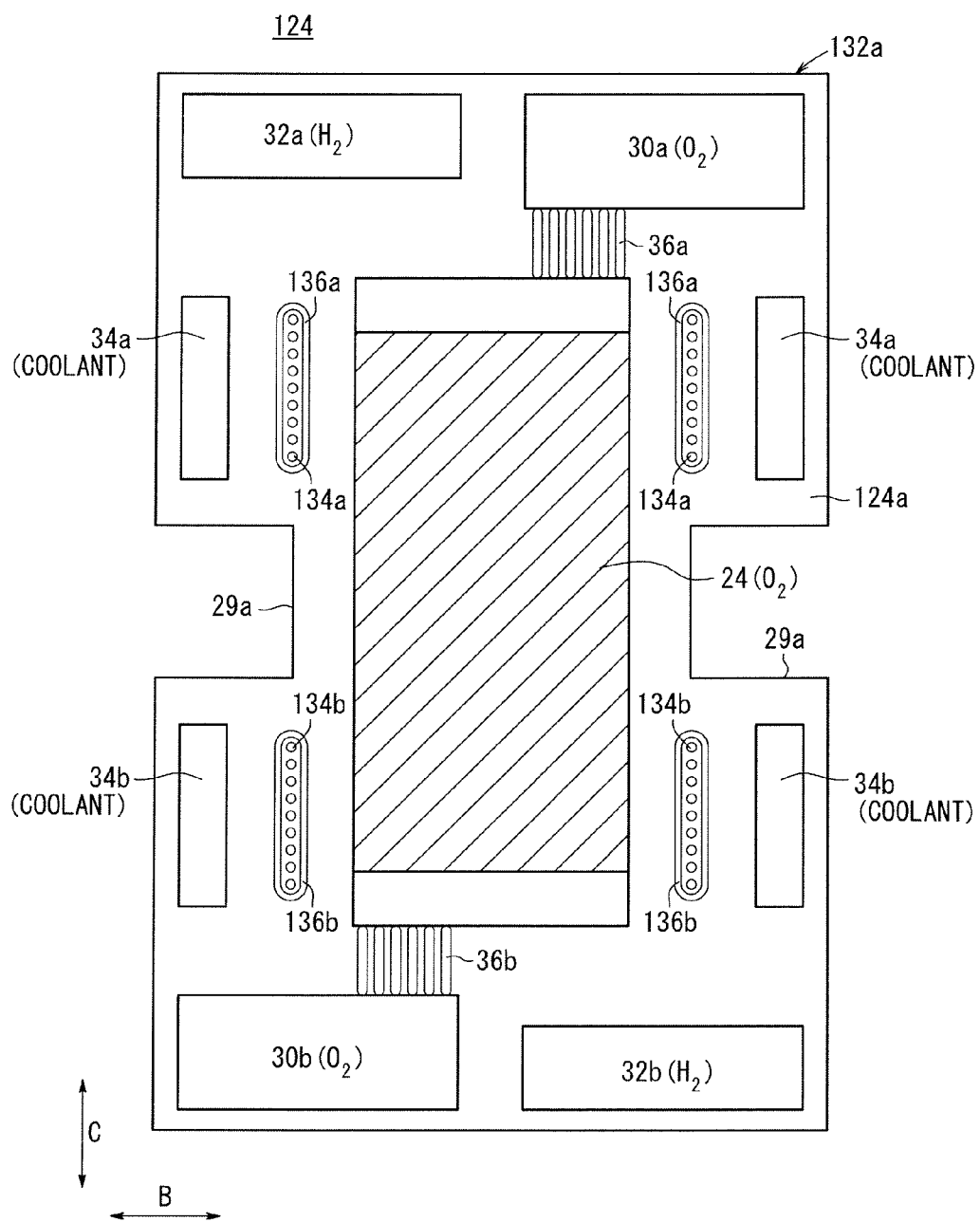
FIG. 17 is a view showing a cathode surface of the first membrane electrode assembly of the fuel cell.

As shown in FIG. 17, at upper positions on both ends of the cathode surface 124a of the frame 132a in the width direction, the inlet grooves 38a are not provided adjacent to the lower side of the coolant supply passages 34a, but a plurality of inlet holes 134a are formed along the width direction of the coolant supply passages 34a in the direction indicated by the arrow C. The inlet holes 134a are surrounded by a ring-shaped inlet seal member 136a.

At lower positions on both ends of the cathode surface 124a of the frame 132a in the width direction, the outlet grooves 38b are not provided adjacent to the upper side of the coolant discharge passages 34b, but a plurality of outlet holes 134b are formed along the width direction of the coolant discharge passages 34b indicated by the arrow C. The outlet holes 134b are surrounded by a ring-shaped outlet seal member 136b.

Figure 18:
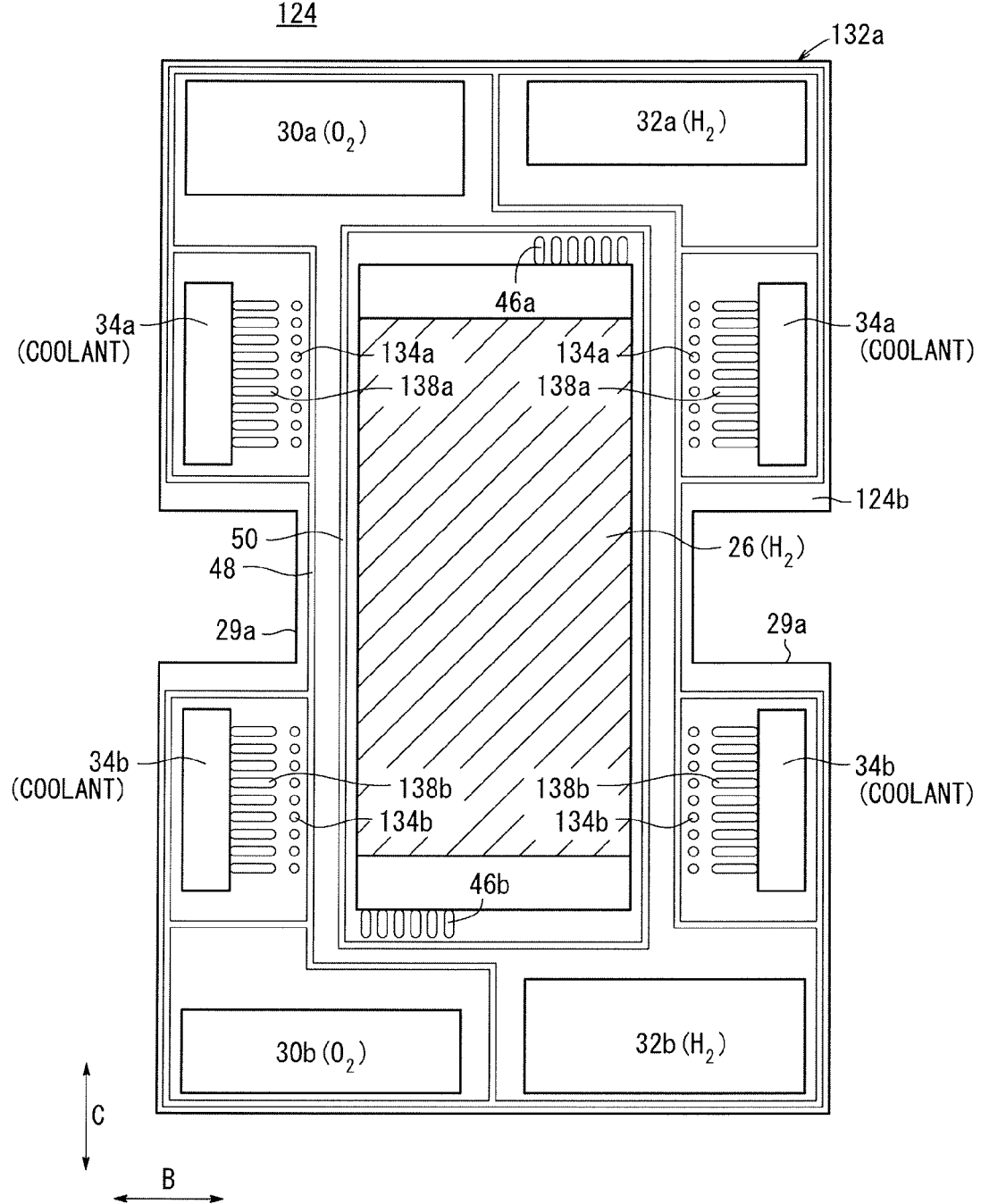
FIG. 18 is a view showing an anode surface of the first membrane electrode assembly.

As shown in FIG. 18, at upper positions on both ends of the anode surface 124b of the frame 132a in the width direction, a plurality of inlet grooves 138a corresponding to the inlet holes 134a are provided, and at lower positions on both ends of the anode surface 124b in the width direction, a plurality of outlet grooves 138b corresponding to the outlet holes 134b are provided.

Figure 19:
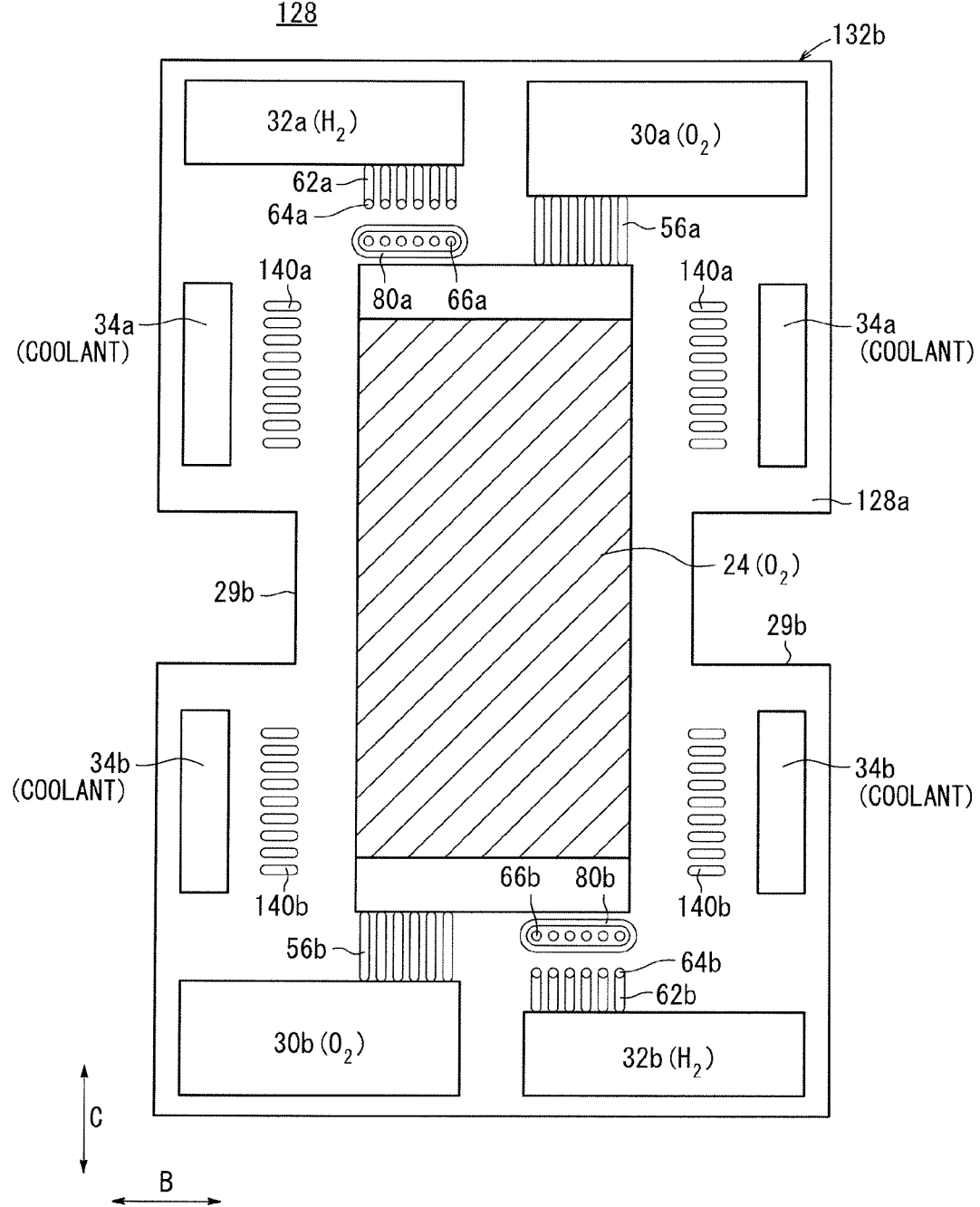
FIG. 19 is a view showing a cathode surface of a second membrane electrode assembly of the fuel cell.

As shown in FIG. 19, at upper positions on both ends of the cathode surface 128a of the frame 132b in the width direction, the inlet holes 60a are not provided adjacent to the lower side of the coolant supply passages 34a, but a plurality of inlet grooves 140a are formed along the width direction of the coolant supply passages 34a.

At lower positions on both ends of the cathode surface 128a of the frame 132b in the width direction, the outlet holes 60b are not provided adjacent to the upper side of the coolant discharge passages 34b, but a plurality of outlet grooves 140b are formed along the width direction of the coolant discharge passages 34b.

Figure 20:
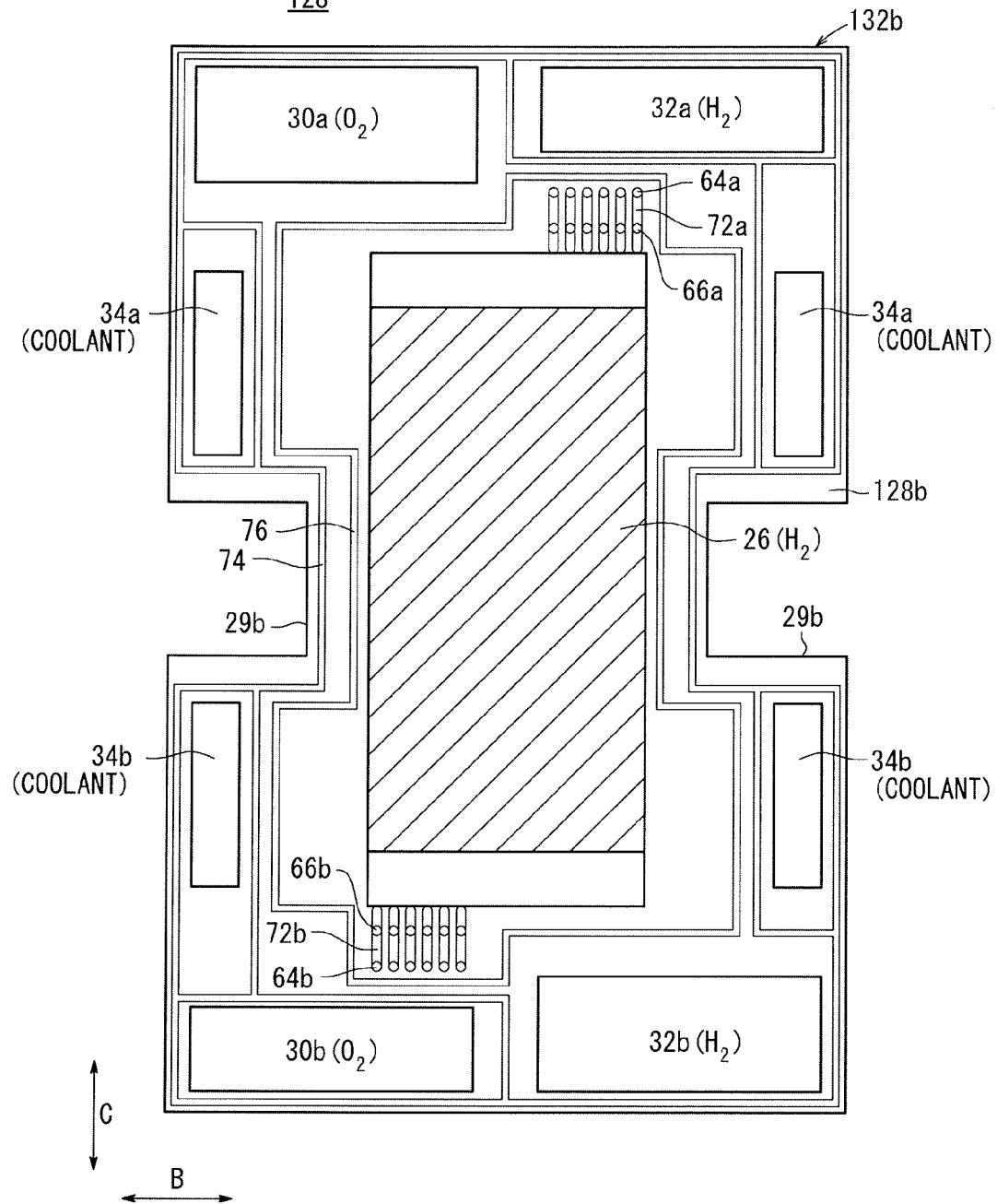
FIG. 20 is a view showing an anode surface of the second membrane electrode assembly.

As shown in FIG. 20, the inlet grooves 68a and the outlet grooves 68b are not provided on the anode surface 128b of the frame 132b.

Figure 21:
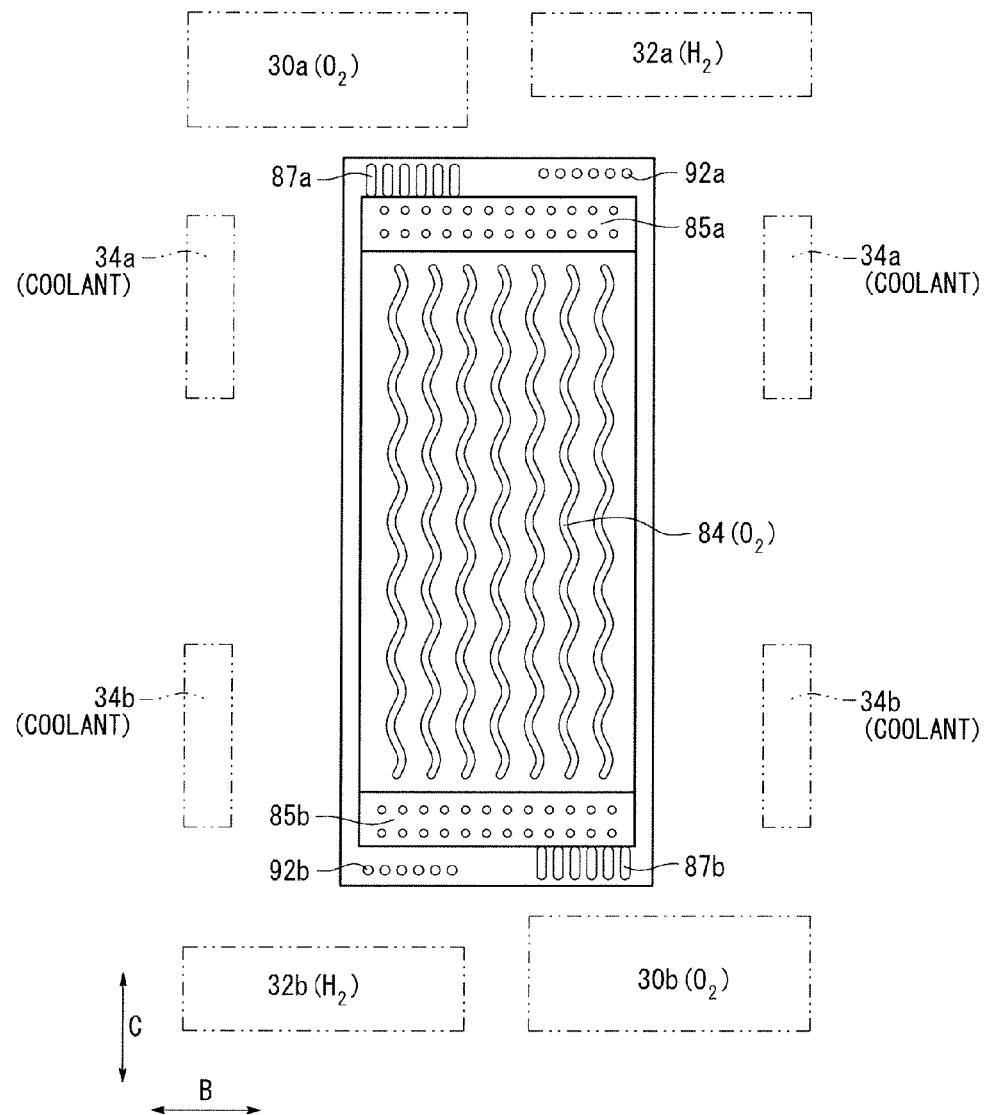
FIG. 21 is a view showing a cathode surface of a first metal separator of the fuel cell.

The first metal separator 126 is made of a single metal plate member. As shown in FIG. 21, a plurality of holes 92a and a plurality of inlet grooves 87a are formed above the oxygen-containing gas flow field 84 provided on one surface of the first metal separator 126, and a plurality of holes 92b and a plurality of outlet grooves 87b are formed below the oxygen-containing gas flow field 84.

The pair of projections 89a and the pair of projections 89b are not provided at both ends of the first metal separator 126 in the width direction, and accordingly the holes 90a, 90b are not provided.

As shown in FIG. 16, the second metal separator 130 includes two metal plates (e.g., stainless plates) 142a, 142b having the same outer shape. The metal plates 142a, 142b are stacked together. The outer circumferential edges of the metal plates 142a, 142b are welded or bonded together, and the internal space between the metal plates 142a, 142b is closed hermetically. The metal plate 142a has an oxygen-containing gas flow field 84 facing the cathode 24, and the metal plate 142b has a fuel gas flow field 86 facing the anode 26. A coolant flow field 88 is formed between the metal plates 142a, 142b.

Figure 22:
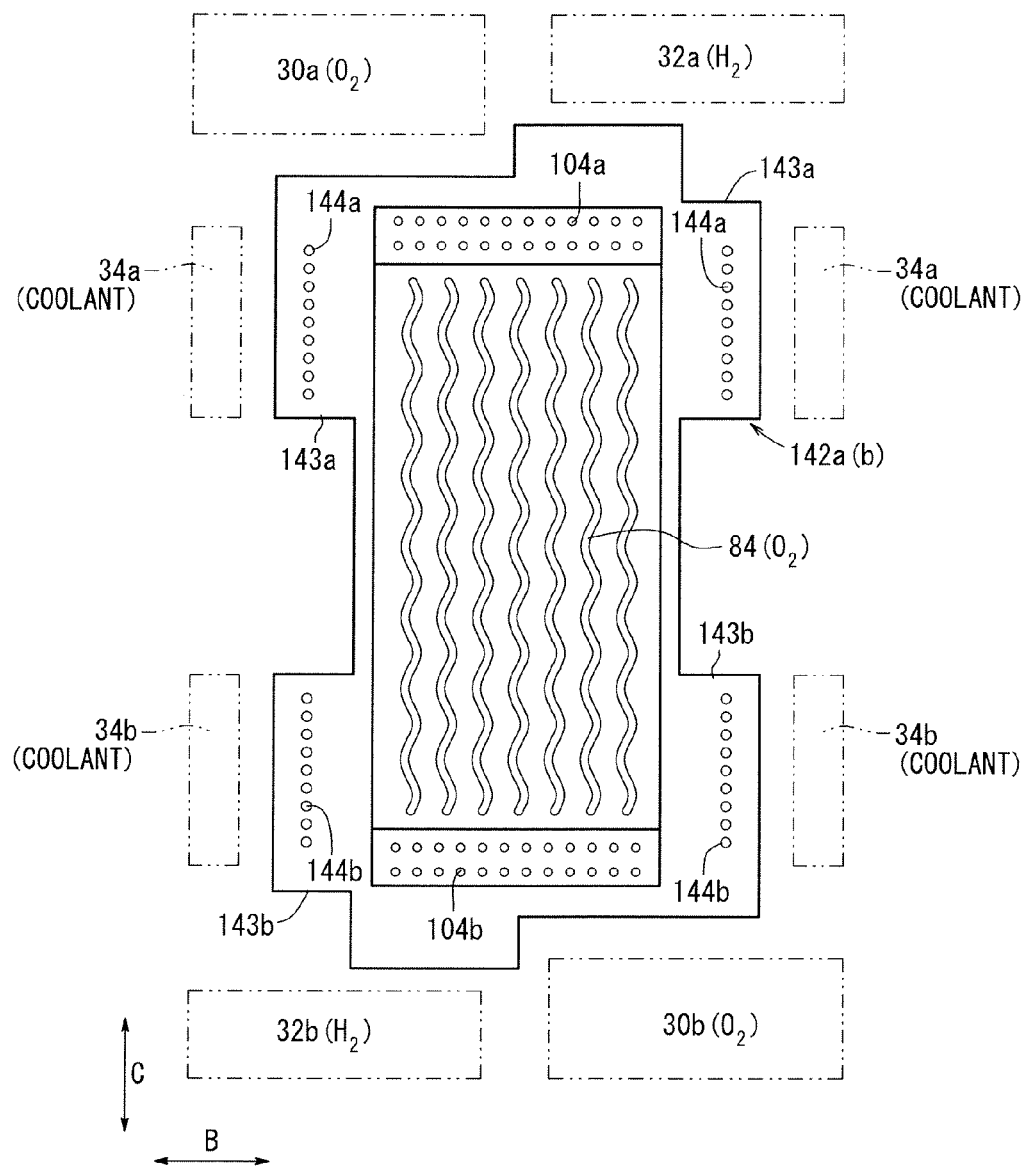
FIG. 22 is a view showing a cathode surface of a second metal separator of the fuel cell.

As shown in FIG. 22, a pair of projections 143a relatively elongated in the direction indicated by the arrow C are provided at upper positions on both ends of the metal plate 142a in the width direction. A plurality of holes 144a are formed in the projections 143a along the width direction of the coolant supply passages 34a. A pair of projections 143b relatively elongated in the direction indicated by the arrow C are provided at lower positions on both ends of the metal plate 142a in the width direction. A plurality of holes 144b are formed in the projections 143b along the width direction of the coolant discharge passages 34b.

Figure 23:
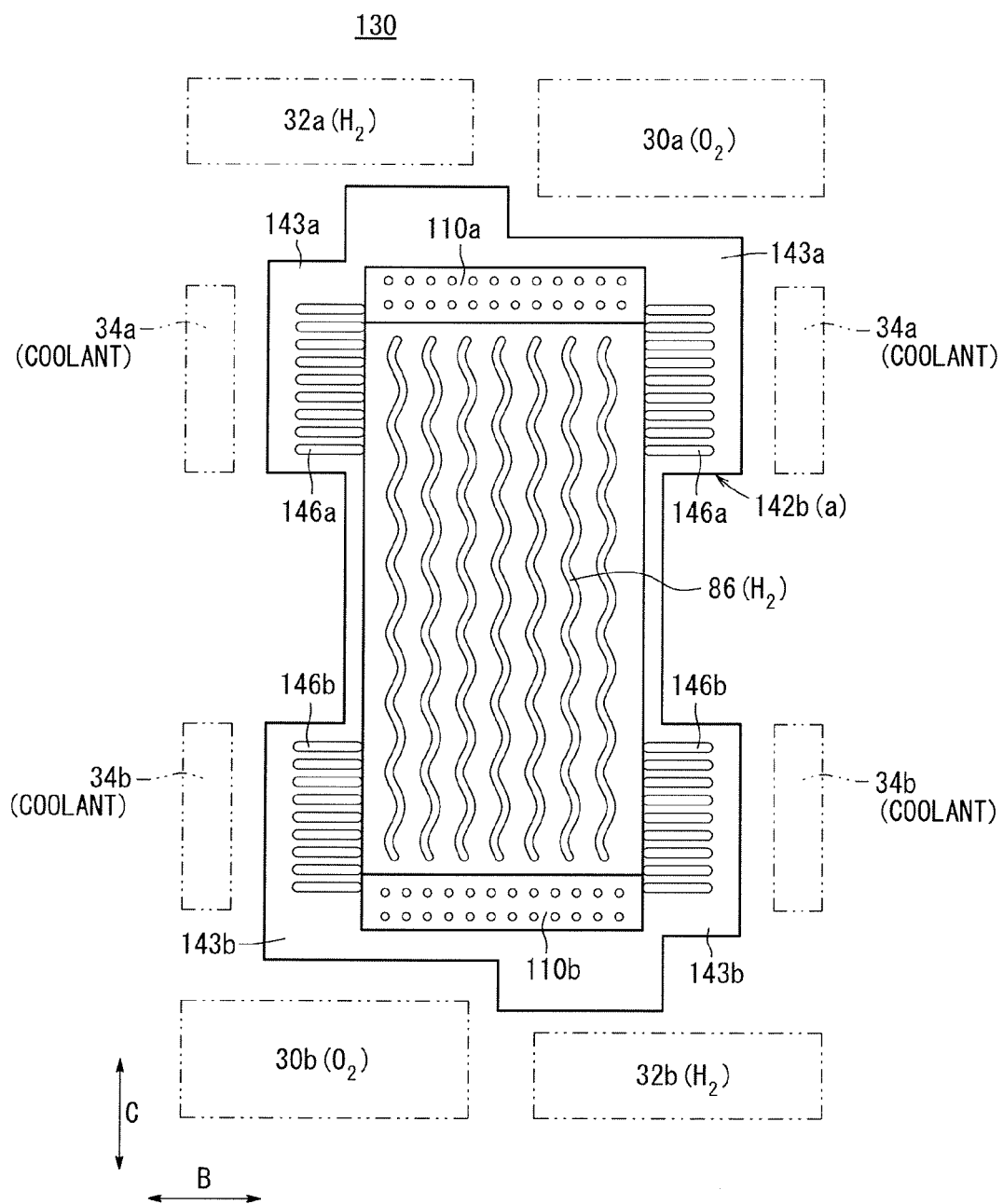
FIG. 23 is a view showing an anode surface of the second metal separator.

As shown in FIG. 23, a plurality of inlet grooves 146a are formed in the pair of projections 143a of the metal plate 142b along the width direction of the coolant supply passages 34a. A plurality of outlet grooves 146b are formed in the pair of projections 143b of the metal plate 142b along the width direction of the coolant discharge passages 34b.

Figure 24:
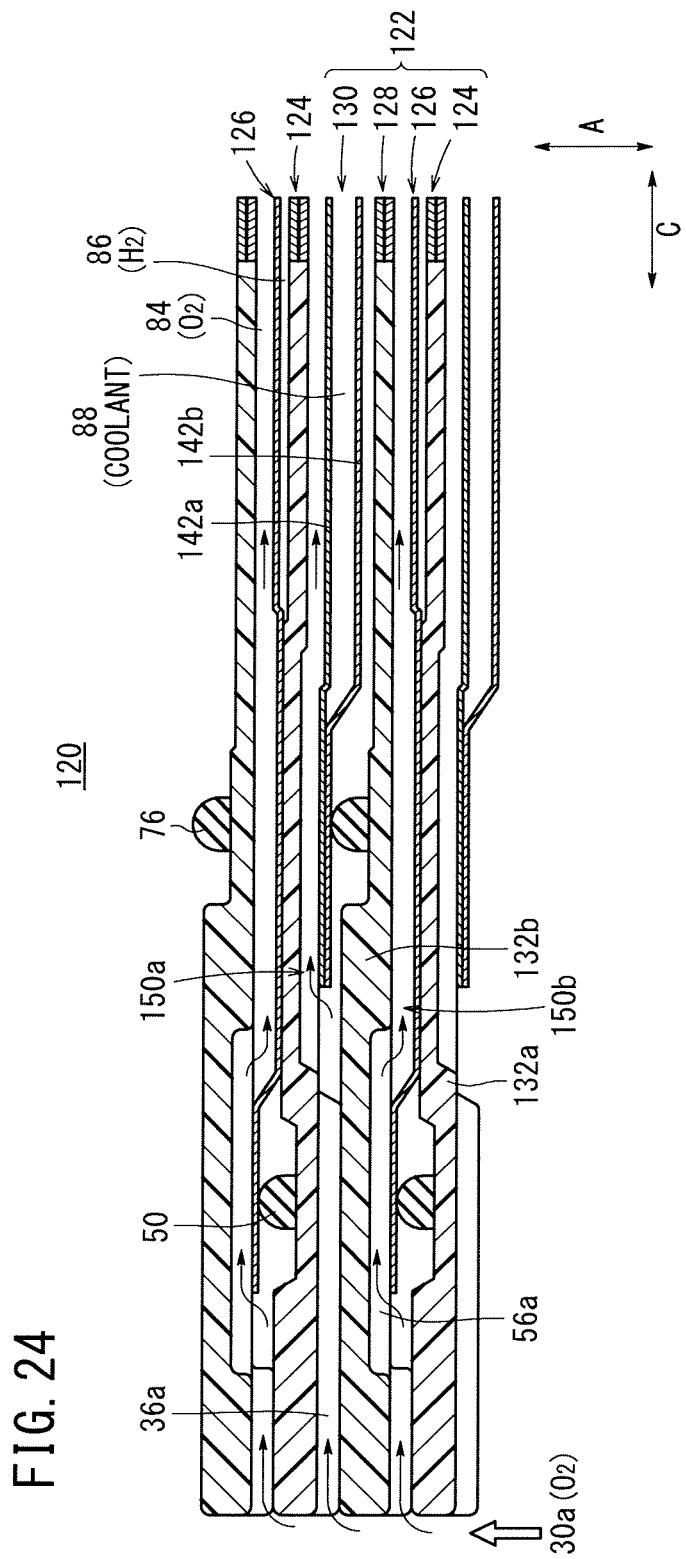
FIG. 24 is a cross sectional view showing the fuel cell, taken along a line XXIV-XXIV in FIG. 15.

As shown in FIG. 24, an oxygen-containing gas connection channel 150a connecting the oxygen-containing gas supply passage 30a with the oxygen-containing gas flow field 84 of the first membrane electrode assembly 124 and an oxygen-containing gas connection channel 150b connecting the oxygen-containing gas supply passage 30a with the oxygen-containing gas flow field 84 of the second membrane electrode assembly 128 are formed between the frames 132a, 132b that are adjacent to each other in the stacking direction. Though not shown, an oxygen-containing gas connection channel connecting the oxygen-containing gas discharge passage 30b with the oxygen-containing gas flow field 84 is formed between the frames 132a, 132b.

Figure 25:
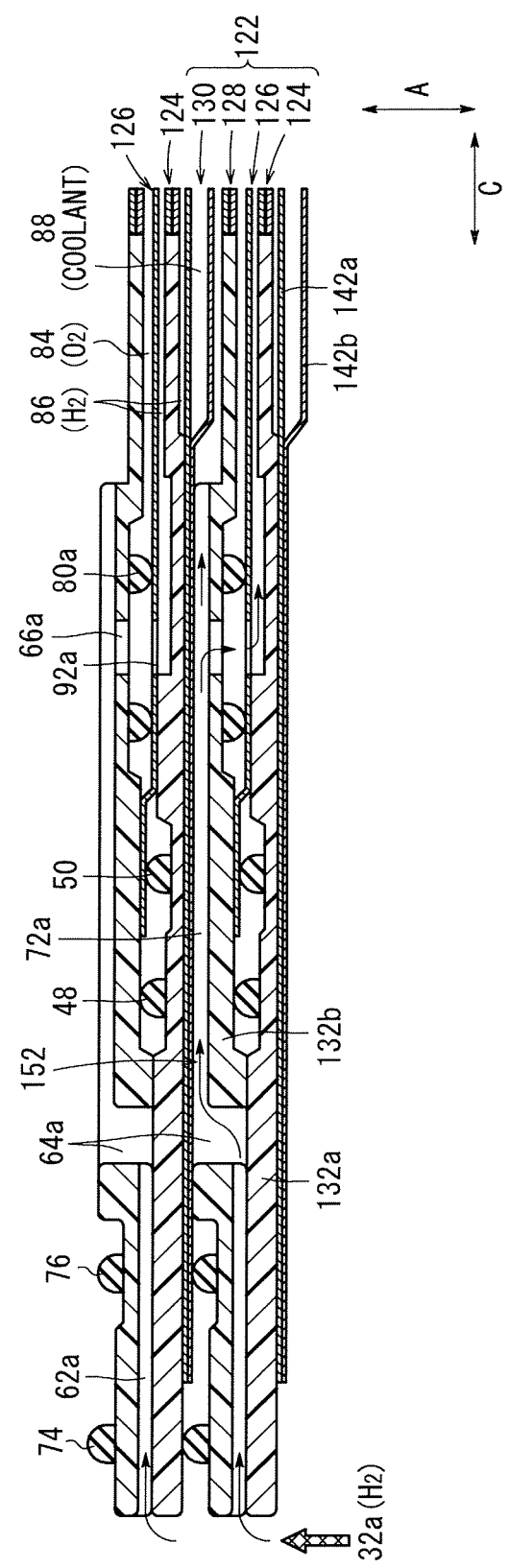
FIG. 25 is a cross sectional view showing the fuel cell, taken along a line XXV-XXV in FIG. 15.

As shown in FIG. 25, a fuel gas connection channel 152 connecting the fuel gas supply passage 32a with the fuel gas flow field 86 is formed between the frames 132a, 132b that are adjacent to each other in the stacking direction. Though not shown, a fuel gas connection channel connecting the fuel gas discharge passage 32b with the fuel gas flow field 86 is formed between the frames 132a, 132b.

Figure 26:
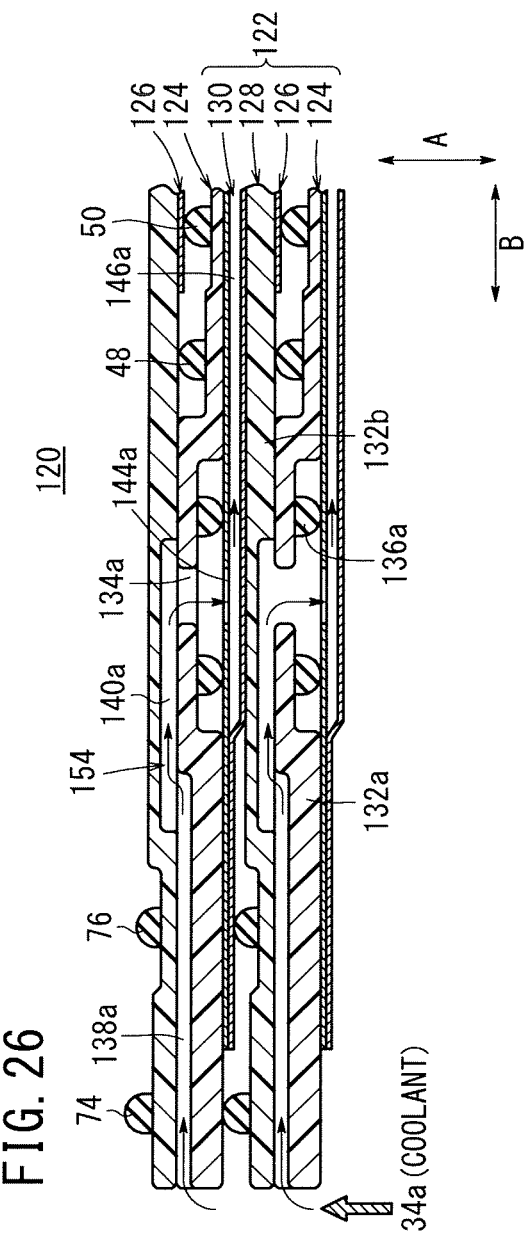
FIG. 26 is a cross sectional view showing the fuel cell, taken along a line XXVI-XXVI in FIG. 15.
Figure 27:
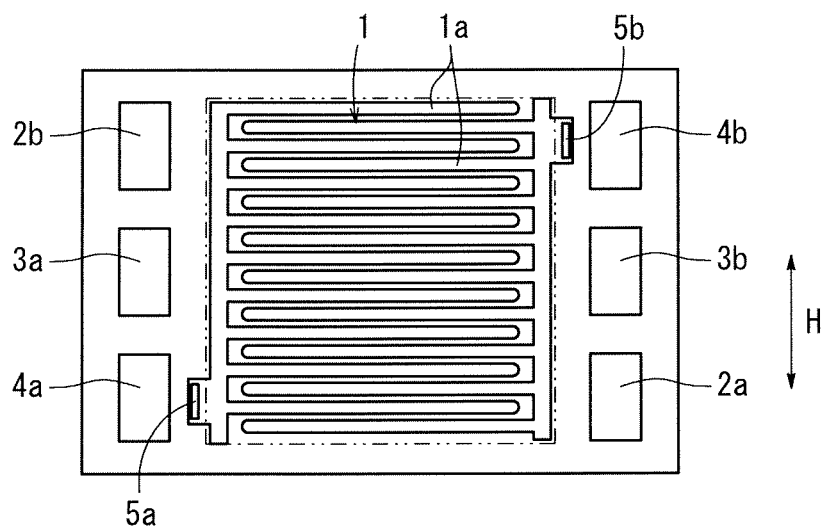
FIG. 27 is a view showing an anode separator of a fuel cell disclosed in Japanese Laid-Open Patent Publication No. 2011-018525.

As shown in FIG. 26, a coolant connection channel 154 connecting the coolant supply passage 34a with the coolant flow field 88 of the second metal separator 130 is formed between the frames 132a, 132b that are adjacent to each other in the stacking direction. Though not shown, a coolant connection channel connecting the coolant discharge passage 34b with the coolant flow field 88 is formed between the frames 132a, 132b.

The coolant connection channel 154 is formed by placing an outer seal member 48 and an inner seal member 50 of the frame 132a and an outer seal member 74 and an inner seal member 76 of the frame 132b at different positions in the stacking direction.

The coolant connection channel 154 includes the inlet grooves 138a, 140a provided along the separator surface, the inlet holes (first holes) 134a formed in the frame 132a in the stacking direction, and the holes (second holes) 144a formed in the metal plate 142a in the stacking direction. Ends of the inlet grooves 138a and ends of the inlet grooves 140a are connected together.

Operation of the fuel cell 120 will be described briefly below.

In each of the cell units 122, as shown in FIGS. 15 and 24, the oxygen-containing gas supplied to the oxygen-containing gas supply passage 30a flows into the inlet grooves 36a of the first membrane electrode assembly 124 and the inlet grooves 56a of the second membrane electrode assembly 128.

The oxygen-containing gas is supplied from the inlet grooves 36a to the oxygen-containing gas flow field 84 of the second metal separator 130. Then, the oxygen-containing gas is supplied from the oxygen-containing gas flow field 84 to the cathode 24 of the first membrane electrode assembly 124. The remaining oxygen-containing gas after consumption in the power generation reaction is discharged through the outlet grooves 36b into the oxygen-containing gas discharge passage 30b.

The oxygen-containing gas supplied to the inlet grooves 56a flows through the inlet grooves 87a between the second membrane electrode assembly 128 and the first metal separator 126, and the oxygen-containing gas is supplied into the oxygen-containing gas flow field 84 of the first metal separator 126. The oxygen-containing gas is supplied from the oxygen-containing gas flow field 84 to the cathode 24 of the second membrane electrode assembly 128. The remaining oxygen-containing gas after consumption in the power generation reaction is discharged through the outlet grooves 87b, 56b into the oxygen-containing gas discharge passage 30b.

Further, as shown in FIGS. 15 and 25, the fuel gas supplied to the fuel gas supply passage 32a flows into the inlet grooves 62a at the cathode 24 of the second membrane electrode assembly 128. The fuel gas from the inlet grooves 62a flows through the inlet holes 64a toward the anode 26, and part of the fuel gas is supplied from the inlet grooves 72a to the fuel gas flow field 86 of the second metal separator 130.

The remaining fuel gas flows through the inlet holes 66a and the holes 92a of the first metal separator 126, and then, the fuel gas flows into between the first metal separator 126 and the first membrane electrode assembly 124, and the fuel gas is supplied to the fuel gas flow field 86 of the first metal separator 126.

The fuel gas that has been consumed in the power generation reaction in the fuel gas flow field 86 of the second metal separator 130 is discharged into the outlet grooves 72b. Then, the fuel gas flows from the outlet holes 64b, and the fuel gas is discharged through the outlet grooves 62b into the fuel gas discharge passage 32b. In the meanwhile, the fuel gas that has been consumed in the power generation reaction in the fuel gas flow field 86 of the first metal separator 126 flows from the holes 92b and then, the fuel gas is discharged through the outlet holes 66b into the outlet grooves 72b. Likewise, the fuel gas is discharged into the fuel gas discharge passage 32b.

Thus, in the first membrane electrode assembly 124 and the second membrane electrode assembly 128, the oxygen-containing gas supplied to the cathode 24 and the fuel gas supplied to the anode 26 are consumed in electrochemical reactions at catalyst layers of the cathode 24 and the anode 26 for generating electricity.

Further, as shown in FIGS. 15 and 26, the coolant supplied to the pair of coolant supply passages 34a flows into the inlet grooves 138a of the first membrane electrode assembly 124, and then the coolant is supplied from the inlet grooves 140a to the inlet holes 134a. The coolant from the inlet holes 134a flows through the holes 144a of the second metal separator 130, into the second metal separator 130.

The coolant flows inside the second metal separator 130 along the inlet grooves 146a inwardly from both sides in the direction indicated by the arrow B, and then, the coolant is supplied to the coolant flow field 88. The coolant flowing inwardly from both sides collides at a central portion of the coolant flow field 88 in the direction indicated by the arrow B. After the coolant moves in the direction of gravity, the coolant is distributed toward both sides in the direction indicated by the arrow B at a lower portion of the coolant flow field 88. The coolant flows from the outlet grooves 146b through the holes 144b, and then, the coolant is discharged from the second metal separator 130. The coolant flows from the outlet holes 134b through the outlet grooves 140b, 138b, and then, the coolant is discharged into the coolant discharge passage 34b.

In the structure, the first membrane electrode assembly 124 and the second membrane electrode assembly 128 are cooled by skip cooling by the coolant flowing through the coolant flow field 88 of the second metal separator 130.

In the second embodiment, the same advantages as in the case of the first embodiment are obtained. For example, reduction in the size and weight of the first metal separator 126 and the second metal separator 130 is achieved easily, the production cost is reduced effectively, and it becomes possible to produce the fuel cell 120 economically as a whole.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell including cell units each formed by stacking a first electrolyte electrode assembly, a first metal separator, a second electrolyte electrode assembly, and a second metal separator in a stacking direction, the first and second electrolyte electrode assemblies each including a pair of electrodes and an electrolyte interposed between the electrodes, a coolant flow field for allowing a coolant to flow inside said first and second metal separators being formed between adjacent said first and second electrolyte electrode assemblies, wherein:

a resin frame member is formed integrally with an outer circumference of each of the first and second electrolyte electrode assemblies, respectively;

a reactant gas supply passage and a reactant gas discharge passage extend through one pair of opposite sides of the resin frame members in the stacking direction as passages of a reactant gas;

a pair of coolant supply passages and a pair of coolant discharge passages extend through the other pair of opposite sides of the resin frame members in the stacking direction for allowing the coolant to flow therethrough, the coolant supply passages being positioned adjacent to the reactant gas supply passage or the reactant gas discharge passage, the coolant discharge passages being positioned adjacent to the reactant gas discharge passage or the reactant gas supply passage;

the fuel cell has connection channels defined between the electrolyte electrode assemblies and the metal separators for connecting the coolant supply passages and the coolant discharge passages with the coolant flow field;

each of the connection channels includes two holes, wherein one said hole is a through hole provided in only one of the adjacent resin frame members and the other hole is provided on one surface of either the first or second metal separator facing the one resin frame member having the through hole, each of said two holes extending in the stacking direction and being physically separated from, and in fluid communication with the coolant supply passages and the coolant discharge passages via the connection channels; and each of the connection channels follows a path formed between the adjacent resin frame members, the connection channels routing the coolant from the coolant supply passages to the coolant flow field along the path and the two holes.

2. The fuel cell according to claim 1, wherein each of the resin frame members has dual seal lines including an outer seal line outside the separator surface and an inner seal line within the separator surface;

a part of the dual seal lines of one of the resin frame members that are adjacent to each other, and a part of the dual seal lines of the other of the resin frame members are provided at different positions in the stacking direction to form the connection channels between the one of the resin frame members and the other of the resin frame members.

3. The fuel cell according to claim 1, wherein at least the first metal separator or the second metal separator includes two plates, and the coolant flow field is formed between the two plates.

4. The fuel cell according to claim 3, wherein the two plates have the same outer shape.

5. The fuel cell according to claim 3, wherein each of the connection channels includes:

a groove provided along the separator surface between the resin frame members that are adjacent to each other in the stacking direction;

a first hole formed in one of the resin frame members in the stacking direction, the first hole being connected to the groove; and a second hole formed in one of the plates that is adjacent to the one of the resin frame members in the stacking direction, the second hole connecting the first hole with the coolant flow field.

6. The fuel cell according to claim 5, wherein the groove of each of the connecting channels includes:

a first groove provided in the one of the resin frame members; and a second groove provided in the other of the resin frame members stacked on the one of the resin frame members; and wherein an end of the first groove and an end of the second groove are connected together.

7. The fuel cell according to claim 5, wherein the first holes of the adjacent cell units are not overlapped with each other in the stacking direction, and also the second holes of the adjacent cell units are not overlapped with each other in the stacking direction.

* * * * *